United States Patent
Chang et al.

(10) Patent No.: US 12,025,459 B2
(45) Date of Patent: Jul. 2, 2024

(54) METHODS AND APPARATUSES FOR NAVIGATION GUIDANCE AND ESTABLISHING A THREE-DIMENSIONAL REAL SCENE MODEL, DEVICE AND MEDIUM

(71) Applicant: BEIJING BAIDU NETCOM SCIENCE AND TECHNOLOGY CO., LTD., Beijing (CN)

(72) Inventors: Pingnan Chang, Beijing (CN); Ye Sun, Beijing (CN); Chen Chen, Beijing (CN); Jia Zhou, Beijing (CN); Shanshan Liu, Beijing (CN); Jin Tian, Beijing (CN); Yao Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 26 days.

(21) Appl. No.: 17/445,890

(22) Filed: Aug. 25, 2021

(65) Prior Publication Data
US 2021/0381846 A1   Dec. 9, 2021

(30) Foreign Application Priority Data
Dec. 15, 2020   (CN) .......................... 202011482341.9

(51) Int. Cl.
*G01C 21/36*   (2006.01)
(52) U.S. Cl.
CPC ....... *G01C 21/3647* (2013.01); *G01C 21/367* (2013.01)
(58) Field of Classification Search
None
See application file for complete search history.

(56) References Cited

U.S. PATENT DOCUMENTS

2004/0098175 A1* 5/2004 Said ................... G01C 21/3632
701/1
2007/0229310 A1* 10/2007 Sato ....................... B60W 50/14
340/995.1
(Continued)

FOREIGN PATENT DOCUMENTS

CN   101097152 A   1/2008
CN   102047302 A   5/2011
(Continued)

OTHER PUBLICATIONS

Chinese Supplemental Search Report issued in corresponding Application No. 2020114823419 on Sep. 20, 2023 (8 pages).
(Continued)

*Primary Examiner* — Rachid Bendidi
*Assistant Examiner* — Selena M Jin
(74) *Attorney, Agent, or Firm* — Hunton Andrews Kurth LLP

(57) ABSTRACT

Provided are methods and apparatuses for navigation guidance and establishing a three-dimensional real scene model, a device and a medium, which relate to the field of artificial intelligence and, in particular, intelligent transportation technologies. A specific implementation includes: determining a navigation route of a navigation device and candidate three-dimensional real scene data corresponding to the navigation route; where the candidate three-dimensional real scene data includes candidate location information, candidate three-dimensional model data and a candidate observation viewing angle; matching real-time positioning information of the navigation device with the candidate location information in the candidate three-dimensional real scene data to obtain target three-dimensional real scene data; and simulating target three-dimensional model data in the target three-dimensional real scene data at a target observation viewing angle in the target three-dimensional real scene data and at (Continued)

a location corresponding to the real-time positioning information to obtain a real-time navigation guidance image.

13 Claims, 8 Drawing Sheets

(56) References Cited

U.S. PATENT DOCUMENTS

| | | | |
|---|---|---|---|
| 2008/0162043 A1* | 7/2008 | Emoto | G01C 21/3638 |
| | | | 701/436 |
| 2011/0050689 A1* | 3/2011 | Seo | G06T 17/05 |
| | | | 345/419 |
| 2011/0054783 A1* | 3/2011 | Kishikawa | G06F 16/29 |
| | | | 701/533 |
| 2013/0321401 A1* | 12/2013 | Piemonte | G06F 16/2291 |
| | | | 345/419 |
| 2021/0293564 A1* | 9/2021 | Deng | G01C 21/3658 |

FOREIGN PATENT DOCUMENTS

| | | |
|---|---|---|
| CN | 103389104 A | 11/2013 |
| CN | 108344422 A | 7/2018 |
| CN | 108955715 A | 12/2018 |

OTHER PUBLICATIONS

Chinese Office Action issued in corresponding Application No. 2020114823419 on Sep. 23, 2023 (26 pages).

* cited by examiner

METHODS AND APPARATUSES FOR NAVIGATION GUIDANCE AND ESTABLISHING A THREE-DIMENSIONAL REAL SCENE MODEL, DEVICE AND MEDIUM

CROSS-REFERENCE TO RELATED APPLICATION(S)

This application claims priority to Chinese Patent Application No. 202011482341.9 filed Dec. 15, 2020, the disclosure of which is incorporated herein by reference in its entirety.

TECHNICAL FIELD

The present disclosure relates to the field of navigation technologies and, in particular, to artificial intelligence and intelligent transportation technologies, specifically, to methods and apparatuses for navigation guidance and establishing a three-dimensional real scene model, a device and a medium.

BACKGROUND

A vehicle drives past multiple intersections during driving. To provide a user with a more intuitive understanding of a turning at an intersection, a map corresponding to the intersection is enlarged so that the user understands the current situation of the intersection in time.

The enlarged map of the intersection includes visually expressed road data and added reasonable arrows, so as to provide the vehicle with driving guidance.

SUMMARY

The present disclosure provides methods and apparatuses for navigation guidance and establishing a three-dimensional real scene model, a device and a medium.

According to an aspect of the present disclosure, a method for navigation guidance is provided. The method includes steps described below.

A navigation route of a navigation device and candidate three-dimensional real scene data corresponding to the navigation route are determined; where the candidate three-dimensional real scene data includes candidate location information, candidate three-dimensional model data and a candidate observation viewing angle.

Real-time positioning information of the navigation device is matched with the candidate location information in the candidate three-dimensional real scene data so that target three-dimensional real scene data is obtained.

Target three-dimensional model data in the target three-dimensional real scene data is simulated at a target observation viewing angle in the target three-dimensional real scene data and at a location corresponding to the real-time positioning information so that a real-time navigation guidance image is obtained.

According to another aspect of the present disclosure, a method for establishing a three-dimensional real scene model is provided. The method includes steps described below.

A basic three-dimensional model is acquired, where the basic three-dimensional model is a model established according to real scenes in multiple intersection coverage regions.

Spatial positioning data is acquired.

The basic three-dimensional model is superimposed with the spatial positioning data, and the superimposed basic three-dimensional model is processed so that the three-dimensional real scene model is formed, where the three-dimensional real scene model includes location information, three-dimensional model data and observation viewing angles and is used for determining candidate three-dimensional real scene data corresponding to a navigation route of a navigation device, where the candidate three-dimensional real scene data is used for generating a real-time navigation guidance image according to real-time positioning information of the navigation device.

According to another aspect of the present disclosure, an apparatus for navigation guidance is provided. The apparatus includes a three-dimensional real scene data acquisition module, a three-dimensional real scene data positioning and matching module and a real-time navigation guidance image display module.

The three-dimensional real scene data acquisition module is configured to determine a navigation route of a navigation device and candidate three-dimensional real scene data corresponding to the navigation route; where the candidate three-dimensional real scene data includes candidate location information, candidate three-dimensional model data and a candidate observation viewing angle.

The three-dimensional real scene data positioning and matching module is configured to match real-time positioning information of the navigation device with the candidate location information in the candidate three-dimensional real scene data to obtain target three-dimensional real scene data.

The real-time navigation guidance image display module is configured to simulate target three-dimensional model data in the target three-dimensional real scene data at a target observation viewing angle in the target three-dimensional real scene data and at a location corresponding to the real-time positioning information to obtain a real-time navigation guidance image.

According to another aspect of the present disclosure, an apparatus for establishing a three-dimensional real scene model is provided. The apparatus includes a three-dimensional model acquisition module, a spatial positioning data acquisition module and a three-dimensional real scene model generation module.

The three-dimensional model acquisition module is configured to acquire a basic three-dimensional model, where the basic three-dimensional model is a model established according to real scenes in multiple intersection coverage regions.

The spatial positioning data acquisition module is configured to acquire spatial positioning data.

The three-dimensional real scene model generation module is configured to superimpose the basic three-dimensional model with the spatial positioning data and process the superimposed basic three-dimensional model to form the three-dimensional real scene model, where the three-dimensional real scene model includes location information, three-dimensional model data and observation viewing angles and is used for determining candidate three-dimensional real scene data corresponding to a navigation route of a navigation device, where the candidate three-dimensional real scene data is used for generating a real-time navigation guidance image according to real-time positioning information of the navigation device.

According to another aspect of the present disclosure, an electronic device is provided. The electronic device includes at least one processor and a memory communicatively connected to the at least one processor.

The memory stores instructions executable by the at least one processor, and the instructions are executed by the at least one processor to cause the at least one processor to perform the method for navigation guidance according to any embodiment of the present disclosure or the method for establishing a three-dimensional real scene model according to any embodiment of the present disclosure.

According to another aspect of the present disclosure, a non-transitory computer-readable storage medium is provided, which stores computer instructions for causing a computer to perform the method for navigation guidance according to any embodiment of the present disclosure or the method for establishing a three-dimensional real scene model according to any embodiment of the present disclosure.

According to another aspect of the present disclosure, a computer program product is provided. The computer program product includes a computer program which, when executed by a processor, implements the method for navigation guidance according to any embodiment of the present disclosure or the method for establishing a three-dimensional real scene model according to any embodiment of the present disclosure.

According to the solutions of the present disclosure, the accuracy of navigation information is improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
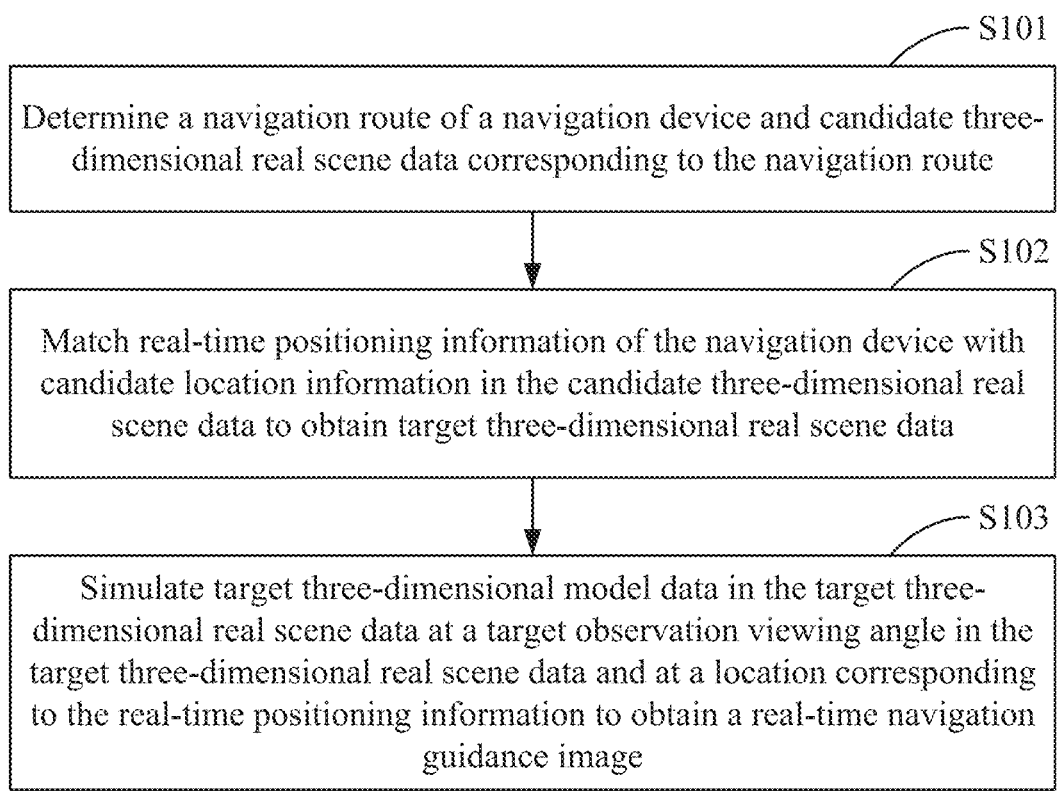
FIG. 1 is a schematic diagram of a method for navigation guidance according to an embodiment of the present disclosure.

FIG. 1 is a flowchart of a method for navigation guidance according to an embodiment of the present disclosure. This embodiment is applicable to the case where a real-time navigation guidance image is generated according to a real-time location of a navigation device. The method of this embodiment may be performed by an apparatus for navigation guidance. The apparatus may be implemented by software and/or hardware and is configured in an electronic device having a certain data computing capability. The electronic device may be a client device including the navigation device or a server device.

In S101, a navigation route of the navigation device and candidate three-dimensional real scene data corresponding to the navigation route are determined. The candidate three-dimensional real scene data includes candidate location information, candidate three-dimensional model data, and a candidate observation viewing angle.

The navigation device is configured to guide a user from a start point to an end point. The navigation device may refer to a device that provides traffic guidance, such as a mobile terminal. More specifically, the navigation device may be a mobile phone or a car-mounted device. The navigation route may be a guiding path from the start point to the end point. The navigation device may be a device that travels along the navigation route. The navigation device may acquire the start point and the end point specified by the user, perform road binding in an actual road network to map the start point to a start point on an actual road in the road network and map the end point to an end point on an actual road in the road network, plan at least one route based on road data in the road network and the start point on the actual road and the end point on the actual road, acquire a route specified by the user, and determine the route as the navigation route. The navigation device may send the start point and the end point specified by the user to a server and receive routes fed back by the server, where the server performs a route planning operation. A route planning algorithm may include a shortest path algorithm, a breadth-first search algorithm, a depth-first search algorithm, a greedy best-first search algorithm or the like.

The candidate three-dimensional real scene data corresponding to the navigation route is used for generating the real-time navigation guidance image for traveling along the navigation route. Different navigation routes correspond to different candidate three-dimensional real scene data. The candidate three-dimensional model data may refer to three-dimensional model data that can be observed along the navigation route. The candidate location information may refer to actual geographic location information corresponding to the candidate three-dimensional model data. The candidate observation viewing angle may refer to a viewing angle at which real scenes are observed during the travel along the navigation route. The candidate observation viewing angle is determined by multiple observation parameters. For example, the observation parameters may include a scale, an external parameter of a camera, an internal parameter of the camera and the like. The external parameter of the camera may include a rotation angle (such as a pitch angle, a roll angle or a yaw angle), a spatial location (such as a height of the camera) or the like. The internal parameter of the camera may include a focal length of the camera, a coordinate of a focal point, a pixel size or the like. Optionally, the observation parameters may include the scale, the pitch angle and the height. Exemplarily, the scale is used for determining a scale of a real scene in an image, the pitch angle is used for determining an angle between the camera and a horizontal plane, and the scale, the pitch angle and the height are combined to determine an observation range that can be observed at the observation viewing angle, that is, a real scene region that can be observed at the observation viewing angle.

In S102, real-time positioning information of the navigation device is matched with the candidate location information in the candidate three-dimensional real scene data such that target three-dimensional real scene data is obtained.

The real-time positioning information may refer to an actual geographic location of the navigation device at a current moment. The real-time positioning information may be acquired through a global navigation satellite system (GNSS). For example, the GNSS may include a BeiDou Navigation Satellite System, a Global Positioning System (GPS), a GLONASS navigation satellite system or the like. In the case where the electronic device is the navigation device, the electronic device may be directly positioned so that the real-time positioning information of the electronic device is acquired. In the case where the electronic device is not the navigation device, the electronic device may communicate with the navigation device to acquire the real-time positioning information sent by the navigation device. The electronic device is an electronic device that performs the method for navigation guidance according to the embodiment of the present disclosure.

The target three-dimensional real scene data is used for generating the real-time navigation guidance image matching the real-time positioning information. The target three-dimensional real scene data includes target location information, target three-dimensional model data and a target observation viewing angle. The target three-dimensional real scene data may be understood as data corresponding to real scenes that can be observed at an actual geographic location matching the real-time positioning information. Optionally, the target three-dimensional real scene data may further include data that corresponds to an induction arrow for simulating the navigation route and that can be observed at the actual geographic location matching the real-time positioning information.

In S103, the target three-dimensional model data in the target three-dimensional real scene data is simulated at the target observation viewing angle in the target three-dimensional real scene data and at a location corresponding to the real-time positioning information so that the real-time navigation guidance image is obtained.

The real-time navigation guidance image is used for presenting a guidance graphic that matches the real-time positioning information. The type of the real-time navigation guidance image may include a real scene image or a pattern image. The target three-dimensional model data is simulated at the target observation viewing angle and at the location corresponding to the real-time positioning information so that the real-time navigation guidance image is obtained, which may be understood as collecting real-time images of the real scenes that can be observed at the location corresponding to the real-time positioning information to form an image, so as to accurately match a navigation guidance image with positioning information.

Figure 2:
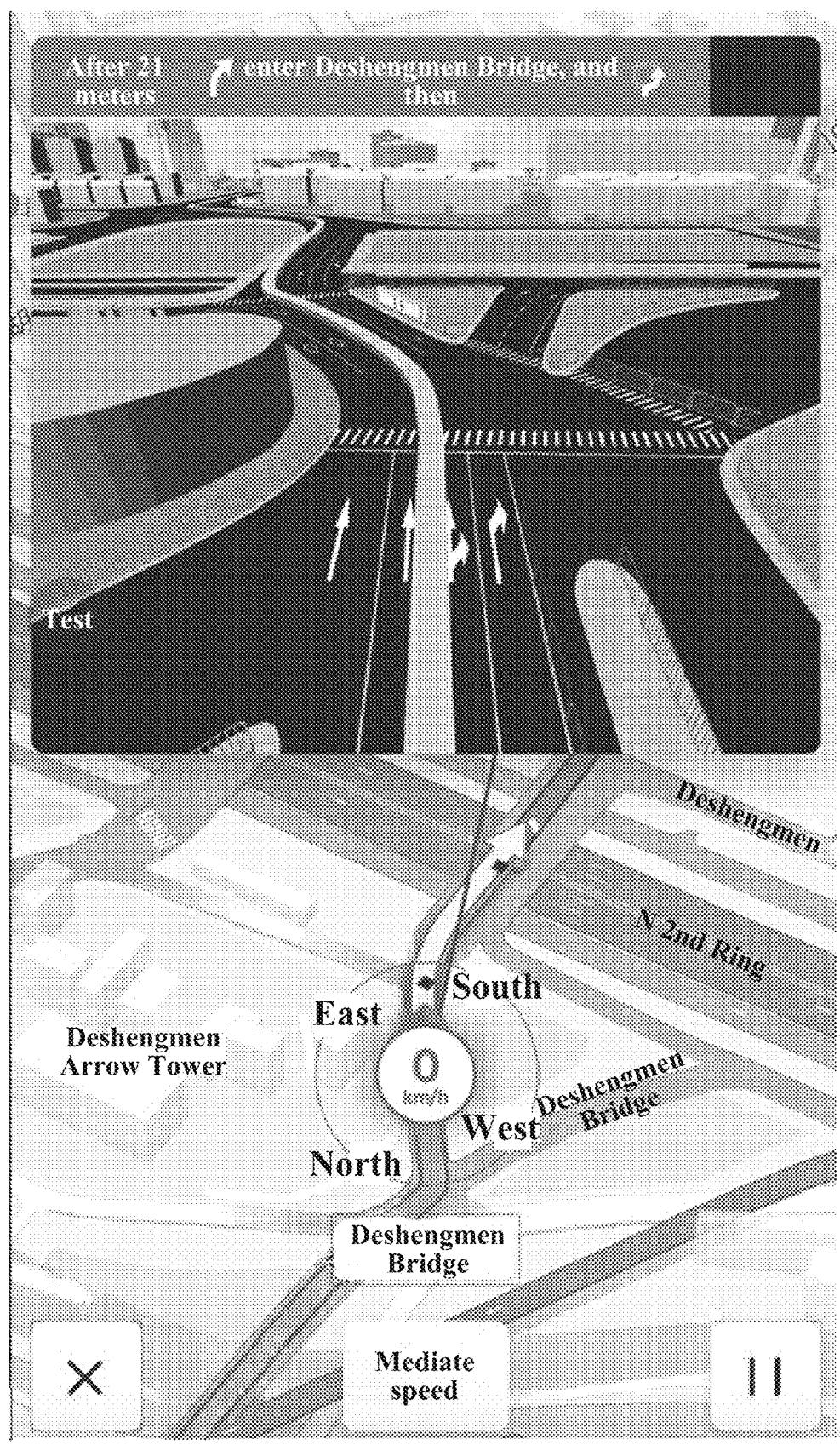
FIG. 2 is a schematic diagram of a real-time guidance image according to an embodiment of the present disclosure.

The real-time navigation guidance image may be displayed at a client to provide the user with a clear and accurate guidance effect. The real-time navigation guidance image may be displayed overlying a standard navigation page. For example, an additional display region is generated on the standard navigation page, and the real-time navigation guidance image is displayed in the display region. As shown in FIG. 2, the real-time navigation guidance image is displayed on a top layer and the standard navigation page is displayed on a bottom layer. An induction graphic and an induction text may also be generated and displayed on the real-time navigation guidance image. As shown in FIG. 2, the induction text is "after 21 meters, enter Deshengmen Bridge and then", and the induction graphics are arrow graphics in the induction text, such as a right front turning arrow and a roundabout turning arrow.

Optionally, the method for navigation guidance further includes: acquiring a real-time driving speed and a real-time driving acceleration; and adjusting a switching speed of the real-time navigation guidance image according to the real-time driving speed and the real-time driving acceleration. The switching speed is the speed of switching from a current real-time navigation guidance image to a next real-time navigation guidance image.

The navigation device is a vehicle device such as a vehicle-mounted terminal device. The real-time driving speed is used for determining whether a vehicle equipped with the navigation device is driving. The real-time driving acceleration is used for detecting a speed change state of the vehicle equipped with the navigation device. The speed change state includes an increasing speed, a decreasing speed or a constant speed. The real-time driving speed and the real-time driving acceleration are used for controlling the switching speed of the real-time navigation guidance image. The switching speed is used for the navigation device to control the navigation guidance image to be displayed, specifically, to adjust a playback speed of a video formed by multiple navigation guidance images.

In a specific example, if the real-time driving speed is 0, the corresponding switching speed is 0; if the real-time driving speed is not 0, the corresponding switching speed is not 0. If the real-time driving acceleration is positive, the switching speed of the current real-time navigation guidance image is faster than the switching speed of a previous real-time navigation guidance image, that is, the switching speed is increased. If the real-time driving acceleration is negative, the switching speed of the current real-time navigation guidance image is slower than that of the previous real-time navigation guidance image, that is, the switching speed is decreased. If the real-time driving acceleration is 0, the switching speed of the current real-time navigation guidance image is the same as that of the previous real-time navigation guidance image, that is, the switching speed is constant.

In fact, in the driving process of the vehicle, positioning is continuously performed, multiple pieces of real-time positioning information are correspondingly acquired, each piece of real-time positioning information corresponds to a respective real-time navigation guidance image. Real-time navigation guidance images are sequentially displayed according to an order in which the multiple pieces of real-time positioning information are acquired so that a video playback effect can be achieved. If the switching speed is increased, the navigation guidance images are switched at an increasing speed, which may be understood as playing the video at an increasing speed. If the switching speed is decreased, the navigation guidance images are switched at a decreasing speed, which may be understood as playing the video at a decreasing speed. If the switching speed is constant, the navigation guidance images are switched at a constant speed, which may be understood as playing the video at a constant speed. The switching speed of 0 may be understood as stopping playing the video and continuously displaying a current navigation guidance image.

Additionally, when the real-time navigation guidance image is switched and displayed, interpolated pixels may be determined according to real-time navigation guidance images before and after switching so that a gap between pixels at the time of image switching can be filled, the continuity of the played video can be increased, the smooth transition of images can be implemented, and the continuity of image switching can be improved. The interpolated pixels may be determined by interpolation methods such as nearest-neighbor interpolation, bilinear interpolation and Lanczos Interpolation.

The speed of switching between navigation guidance images is determined according to a real-time driving state of the vehicle so that the switching between navigation guidance images can be accurately matched with the real-time driving state of the vehicle, the video effect of continuously playing the navigation guidance images can be accurately matched with the real-time driving state of the vehicle, and guidance images can be accurately displayed in real time according to a driving behavior of the user, thereby improving the accuracy of navigation information.

According to the solution of the present disclosure, the navigation route of the navigation device and the candidate three-dimensional real scene data corresponding to the navigation route are determined, and the target three-dimensional real scene data matching the real-time positioning information of the navigation device is queried from the candidate three-dimensional real scene data in real time according to the real-time positioning information of the navigation device so that the real-time navigation guidance image is formed, thereby accurately matching the real-time positioning information with the real-time navigation guidance image. In this manner, a dynamic location of the navigation device is sensed and the real-time navigation guidance image accurately matched is generated in real time according to the dynamically changing location so that navigation guidance is accurately matched with an actual driving behavior, thereby improving the accuracy of the navigation information and a navigation guidance effect.

Figure 3:
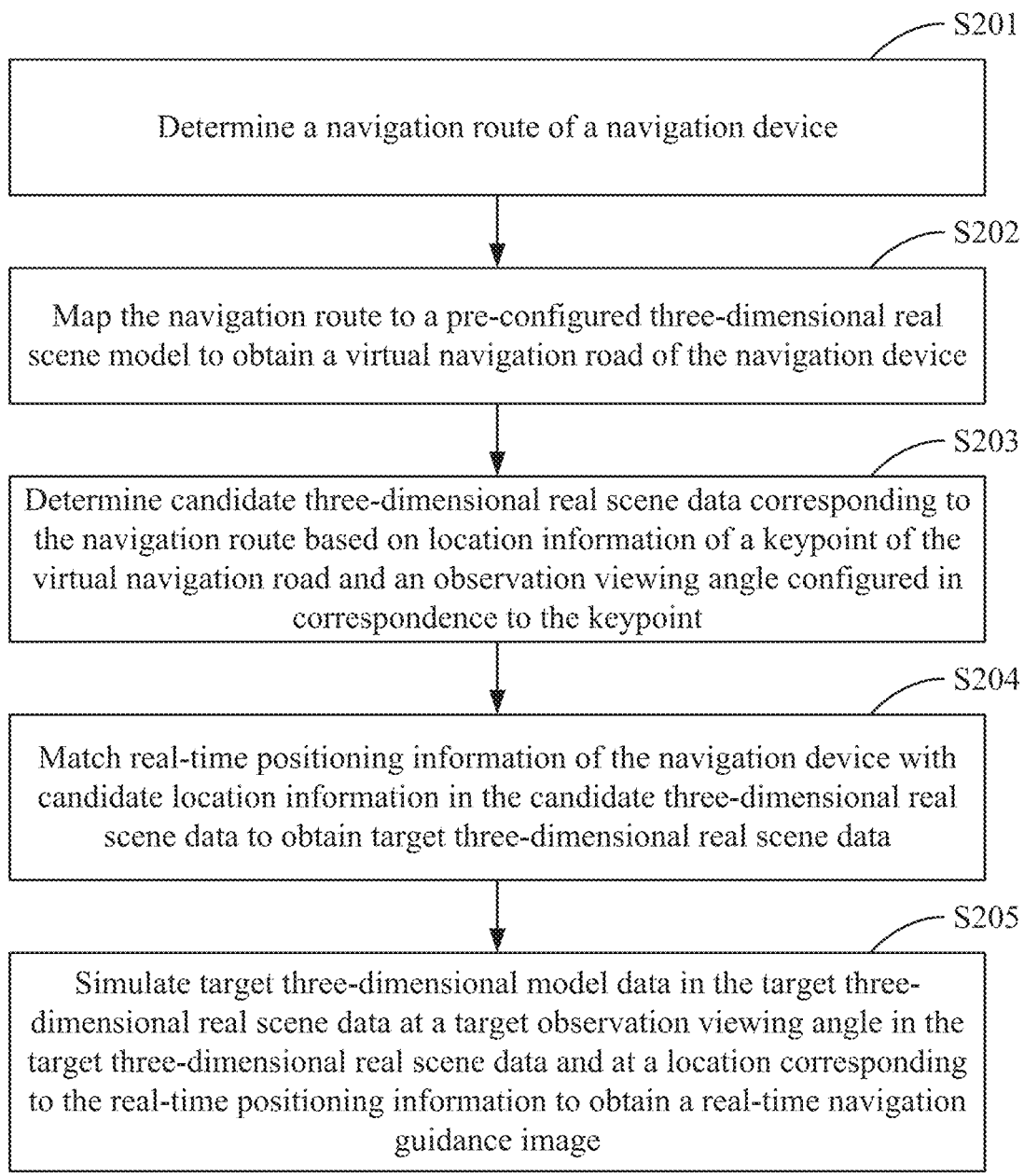
FIG. 3 is a schematic diagram of a method for navigation guidance according to an embodiment of the present disclosure.

FIG. 3 is a flowchart of another method for navigation guidance according to an embodiment of the present disclosure. The method for navigation guidance is further optimized and extended based on the preceding solution and may be combined with the preceding various optional embodiments.

Optionally, the step of determining the candidate three-dimensional real scene data corresponding to the navigation route includes: mapping the navigation route to a pre-configured three-dimensional real scene model to obtain a virtual navigation road of the navigation device; and determining the candidate three-dimensional real scene data corresponding to the navigation route based on location information of a keypoint of the virtual navigation road and an observation viewing angle configured in correspondence to the keypoint.

The method for navigation guidance, shown in FIG. 3, includes steps described below.

In S201, a navigation route of a navigation device is determined.

For details of this embodiment, reference may be made to the description of any embodiment described above.

In S202, the navigation route is mapped to a pre-configured three-dimensional real scene model so that a virtual navigation road of the navigation device is obtained.

The three-dimensional real scene model is a basic three-dimensional model with additional geographic location information. The three-dimensional real scene model may be generated by an electronic device that performs the method for navigation guidance or may be received from another electronic device.

Optionally, the three-dimensional real scene model may be configured as follows: a basic three-dimensional model is acquired, where the basic three-dimensional model is a model established according to real scenes in multiple intersection coverage regions; spatial positioning data is acquired; and the basic three-dimensional model is superimposed with the spatial positioning data, and the superimposed basic three-dimensional model is processed so that the three-dimensional real scene model is formed. The three-dimensional real scene model includes location information, three-dimensional model data and observation viewing angles.

The virtual navigation road is a virtual road matching the navigation route in the three-dimensional real scene model. A virtual road network may be abstracted from the three-dimensional real scene model configured with location information. Mapping the navigation route to the three-dimensional real scene model may refer to binding the navigation route to a virtual road in the virtual road network, where the bound road is the virtual navigation road. For a method for binding the navigation route to the virtual navigation road, reference may be made to a route planning algorithm of an actual road network.

In S203, candidate three-dimensional real scene data corresponding to the navigation route is determined based on location information of a keypoint of the virtual navigation road and an observation viewing angle configured in correspondence to the keypoint. The candidate three-dimensional real scene data includes candidate location information, candidate three-dimensional model data and a candidate observation viewing angle.

The three-dimensional real scene model is pre-configured with multiple virtual navigation roads, and each virtual navigation road is configured with a keypoint, location information of the keypoint and an observation viewing angle corresponding to the keypoint. The keypoint is used for stimulating a location of the navigation device in the three-dimensional real scene model (or the virtual road network abstracted from the three-dimensional real scene model). The keypoint may be understood as the position at which the navigation device can arrive when traveling in the virtual road network of the three-dimensional real scene model. Interpolation may also be performed between keypoints so that data except the keypoints is obtained. A few keypoints are configured so that the amount of redundancy of location information can be reduced and the storage cost and transmission cost of the location information can be reduced.

The location of the navigation device in the virtual road network of the three-dimensional real scene model may be determined based on the location information of the keypoint of the virtual navigation road and the observation viewing angle configured in correspondence to the keypoint. The candidate three-dimensional model data that is visualized and the candidate location information corresponding to the candidate three-dimensional model data may be determined according to the location of the navigation device in the virtual road network and at the corresponding observation viewing angle, and the corresponding observation viewing angle is used as the candidate observation viewing angle. Therefore, the candidate three-dimensional model data may refer to three-dimensional model data that can be observed within an observation range of the observation viewing angle corresponding to each keypoint.

Optionally, the step in which the candidate three-dimensional real scene data corresponding to the navigation route is determined based on the location information of the keypoint of the virtual navigation road and the observation viewing angle configured in correspondence to the keypoint includes: determining induction arrow model data and location information corresponding to the induction arrow model data according to a preset induction arrow model material and the location information of the keypoint of the virtual navigation road; and using background model data in the three-dimensional real scene model and the induction arrow model data as the candidate three-dimensional model data in the candidate three-dimensional real scene data, using the location information corresponding to the induction arrow model data and location information corresponding to the background model data in the three-dimensional real scene model as the candidate location information in the candidate three-dimensional real scene data, and using the observation viewing angle configured in correspondence to the keypoint of the virtual navigation road as the candidate observation viewing angle in the candidate three-dimensional real scene data.

An induction arrow model may refer to an arrow model for simulating the navigation route in the three-dimensional real scene model. The induction arrow model is used for simulating a traveling route in the three-dimensional real scene model. The induction arrow model corresponds to the navigation route. Different navigation routes correspond to different induction arrow models. In FIG. 2, a stereoscopic model of an earthworm line on a driveway is the induction arrow model, where the head of an arrow is at an exit position (not shown) of an intersection. The induction arrow model material may refer to a parameter for constructing the induction arrow model, such as chartlet, texture or shape (typically represented by a block) of the induction arrow model. The induction arrow model material is used as the induction arrow model data for forming a pattern of the induction arrow model. The location information of each keypoint of the virtual navigation road is used as the location information corresponding to the induction arrow model data for forming a distribution location of the induction arrow model. Additionally, different induction arrow model materials may be configured in correspondence to different navigation routes. Optionally, the induction arrow model may be configured as a dynamic water flow animation for prompting a user a traveling direction, where a water flow direction in the water flow animation is the traveling direction of the navigation device.

The background model data is model data of real scenes in the three-dimensional real scene model. The real scenes may refer to various roads and buildings around the roads, such as intersections, roads, lights, signs, roadside landscapes, residential buildings and commodity buildings. The background model data is determined according to a background model material.

In fact, different vehicles may have different navigation routes but come across the same real scenes. Different navigation routes correspond to the same background model data which corresponds to the same location information.

The candidate three-dimensional model data includes the induction arrow model data corresponding to the navigation route and the background model data. The location information includes the location information corresponding to the background model data and the location information corresponding to the induction arrow model data, where the location information corresponding to the induction arrow model data corresponds to the navigation route. The candidate observation viewing angle is the observation viewing angle corresponding to each keypoint of the virtual navigation road.

The induction arrow model data and the corresponding location information are determined by the induction arrow model material and the location information of the keypoint of the virtual navigation road, and the induction arrow model is accurately matched with the navigation route so that the traveling route is accurately simulated in the three-dimensional real scene model by the induction arrow model, the accuracy of navigation guidance of the induction arrow model is improved, and road conditions and road shapes in the front are shown in advance, thereby improving the traveling safety of the user.

In S204, real-time positioning information of the navigation device is matched with the candidate location information in the candidate three-dimensional real scene data so that target three-dimensional real scene data is obtained.

In S205, target three-dimensional model data in the target three-dimensional real scene data is simulated at a target observation viewing angle in the target three-dimensional real scene data and at a location corresponding to the real-time positioning information so that a real-time navigation guidance image is obtained.

According to the solution of the present disclosure, the navigation route is bound to the virtual navigation road in the three-dimensional real scene model, a position in the three-dimensional real scene model may be accurately matched with an actual location during the travel along the navigation route, and the candidate three-dimensional real scene data corresponding to the navigation route is selected based on the location information of the keypoint of the virtual navigation road and the observation viewing angle of the keypoint so that the real-time navigation guidance image that accurately corresponds to the actual location is generated according to the candidate three-dimensional real scene data, and the accuracy of a correspondence between the real-time navigation guidance image and the real-time positioning information can be improved.

Figure 4:
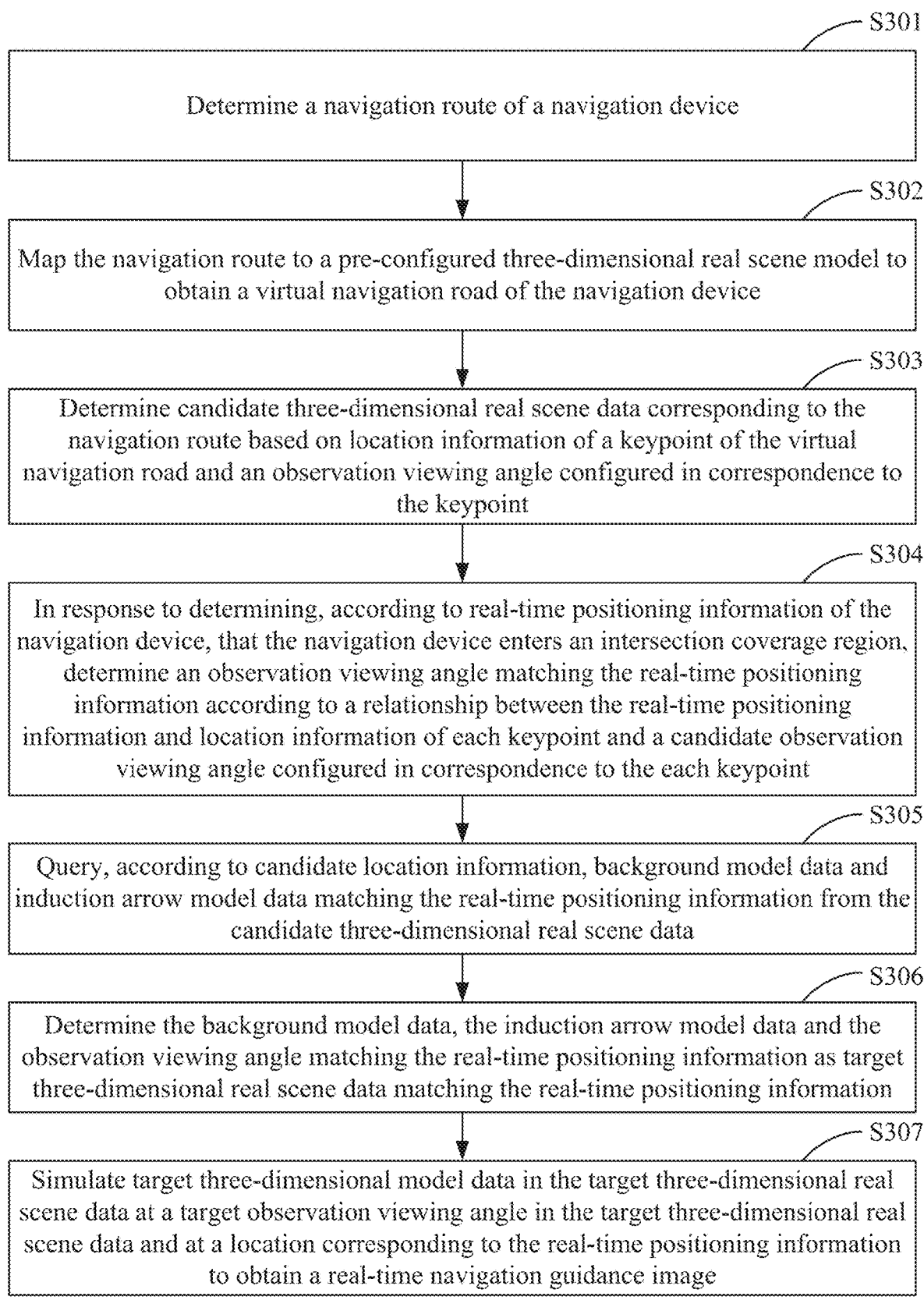
FIG. 4 is a schematic diagram of a method for navigation guidance according to an embodiment of the present disclosure.

FIG. 4 is a flowchart of another method for navigation guidance according to an embodiment of the present disclosure. The method for navigation guidance is further optimized and extended based on the preceding solution and may be combined with the preceding various optional embodiments.

Optionally, the step in which the real-time positioning information of the navigation device is matched with the candidate location information in the candidate three-dimensional real scene data so that the target three-dimensional real scene data is obtained includes: in response to determining, according to the real-time positioning information of the navigation device, that the navigation device enters an intersection coverage region, querying, according to the candidate location information, background model data and induction arrow model data matching the real-time positioning information from the three-dimensional real scene data; determining an observation viewing angle matching the real-time positioning information according to an observation viewing angle matching the keypoint and a relationship between the real-time positioning information and location information of a target keypoint in target model data; and determining the background model data, the induction arrow model data and the observation viewing angle matching the real-time positioning information as the target three-dimensional real scene data matching the real-time positioning information.

The method for navigation guidance, shown in FIG. 4, includes steps described below.

In S301, a navigation route of a navigation device is determined.

For details of this embodiment, reference may be made to the description of any embodiment described above.

In S302, the navigation route is mapped to a pre-configured three-dimensional real scene model so that a virtual navigation road of the navigation device is obtained.

In S303, candidate three-dimensional real scene data corresponding to the navigation route is determined based on location information of a keypoint of the virtual navigation road and an observation viewing angle configured in correspondence to the keypoint. The candidate three-dimensional real scene data includes candidate location information, candidate three-dimensional model data and a candidate observation viewing angle.

In S304, in response to determining, according to real-time positioning information of the navigation device, that the navigation device enters an intersection coverage region, an observation viewing angle matching the real-time positioning information is determined according to a relationship between the real-time positioning information and location information of each keypoint and a candidate observation viewing angle configured in correspondence to the each keypoint.

The intersection coverage region may refer to a region including at least one intersection. In fact, for a straight road or other intersections with relatively simple road conditions and road shapes, navigation information is relatively simple and an existing standard navigation page is simply provided without a real-time navigation guidance image being configured. A location range of the intersection coverage region may be pre-configured, and whether the navigation device is within the location range of the intersection coverage region is determined according to the real-time positioning information of the navigation device, so as to determine whether the navigation device is within the intersection coverage region.

The relationship between the real-time positioning information and the location information of each keypoint may refer to a location relationship between a location to which the real-time positioning information is mapped in the three-dimensional real scene model and each keypoint. The location relationship is used for determining whether the real-time positioning information is mapped to any keypoint of the virtual navigation road.

Exemplarily, a keypoint with a minimum distance in the location relationship may be selected according to the location relationship as a keypoint matching the real-time positioning information, and a candidate observation viewing angle corresponding to the keypoint is determined as the observation viewing angle matching the real-time positioning information.

In another example, when the location to which the real-time positioning information is mapped in the three-dimensional real scene model is the same as a certain keypoint, the keypoint is determined as a target keypoint matching the real-time positioning information. When the location to which the real-time positioning information is mapped in the three-dimensional real scene model is different from each keypoint, interpolation may be performed between two keypoints with the minimum distance, and one interpolated coordinate point is selected from interpolated coordinate points and determined to be an interpolated coordinate point matching the real-time positioning information. A candidate observation viewing angle corresponding to the interpolated coordinate point is determined to be the observation viewing angle matching the real-time positioning information.

Optionally, the step in which the observation viewing angle matching the real-time positioning information is determined according to the relationship between the real-time positioning information and the location information of the each keypoint and the candidate observation viewing angle configured in correspondence to the each keypoint includes: in response to the real-time positioning information being the same as location information of a first target keypoint, acquiring a candidate observation viewing angle corresponding to the first target keypoint as the observation viewing angle matching the real-time positioning information; in response to the real-time positioning information being between two second target keypoints, performing interpolation between the two second target keypoints of the virtual navigation road to form multiple interpolated coordinate points, and performing interpolation between candidate observation viewing angles corresponding to the two second target keypoints to form candidate observation viewing angles corresponding to the multiple interpolated coordinate points; and querying a target interpolated coordinate point that is the same as the real-time positioning information from the multiple interpolated coordinate points, and using a candidate observation viewing angle corresponding to the target interpolated coordinate point as the observation viewing angle matching the real-time positioning information.

The first target keypoint is a keypoint the same as the real-time positioning information. The candidate observation viewing angle corresponding to the first target keypoint may be directly determined to be the observation viewing angle matching the real-time positioning information.

Two second target keypoints are generally provided, and the real-time positioning information is located on a virtual navigation road between the two second target keypoints. The interpolation may be performed between the two second target keypoints according to a set distance so that multiple interpolated coordinate points are formed, and each interpolated coordinate point is located on the virtual navigation road between the two second target keypoints. Optionally, a distance between every two adjacent interpolated coordinate points is the same. An interpolation location between the two target keypoints is associated with a traveling state of the navigation device and whether the navigation device is within a complex intersection region. The traveling state of the navigation device may include a driving state of a vehicle or a walking state of a pedestrian. The driving state of the vehicle includes a driving speed, a driving acceleration or the like of the vehicle. Exemplarily, a fast driving speed and/or a large driving acceleration of the navigation device correspond to a high degree of density of interpolated coordinate points and a large number of interpolated coordinate points. For example, five interpolated coordinate points are inserted every 10 meters. A slow driving speed and/or a small driving acceleration of the navigation device correspond to a low degree of density of interpolated coordinate points and a small number of interpolated coordinate points. For example, two interpolated coordinate points are inserted every 10 meters. In another example, if the navigation device is in the complex intersection region, the degree of density of interpolated coordinate points is relatively high; and if the navigation device is not in the complex intersection region, the degree of density of interpolated coordinate points is relatively low. Moreover, the interpolation is performed between the candidate observation viewing angles corresponding to the two second target keypoints and in correspondence to the interpolation coordinate points so that the candidate observation viewing angles corresponding to the interpolated coordinate points are generated. The interpolation between candidate observation viewing angles is to perform the interpolation on each of observation parameters. For example, the interpolation is performed between two scales, between two pitch angles, and between two heights of a camera. An interpolation location between candidate observation viewing angles corresponding to two target keypoints is associated with the traveling state of the navigation device and whether the navigation device is in the complex intersection region. For an interpolation algorithm, reference may be made to what is described above. An interpolated coordinate point that is the same as the real-time positioning information is queried according to location information of multiple interpolated coordinate points, and a candidate observation viewing angle corresponding to the interpolated coordinate point is determined to be the observation viewing angle matching the real-time positioning information.

A keypoint or an interpolated coordinate point whose location information is the same as the real-time positioning information is determined, and the observation viewing angle matching the real-time positioning information is determined based on the observation viewing angle of the keypoint or the interpolated coordinate point so that observation viewing angles matching different real-time location information are accurately distinguished, the real-time navigation guidance image is controlled to be generated with smaller granularity, and the accuracy of a location corresponding to the real-time navigation guidance image is improved, thereby improving guidance accuracy.

In S305, background model data and induction arrow model data matching the real-time positioning information are queried from the candidate three-dimensional real scene data according to the candidate location information.

The background model data and the induction arrow model data matching the real-time positioning information are used for forming real scene content and induction arrow content in the real-time navigation guidance image, respectively. The background model data and the induction arrow model data matching the real-time positioning information may include background model data and induction arrow model data near the location to which the real-time positioning information is mapped in the three-dimensional real scene model. That the background model data and the induction arrow model data matching the real-time positioning information are queried from the candidate three-dimensional real scene data according to the candidate location information may refer to determining a location range matching the real-time positioning information and then determining background model data and induction arrow model data within the location range according to the candidate location information.

In S306, the background model data, the induction arrow model data and the observation viewing angle matching the real-time positioning information are determined as target three-dimensional real scene data matching the real-time positioning information.

In S307, target three-dimensional model data in the target three-dimensional real scene data is simulated at a target observation viewing angle in the target three-dimensional real scene data and at a location corresponding to the real-time positioning information so that the real-time navigation guidance image is obtained.

The target three-dimensional real scene data matching the real-time positioning information is acquired only when the navigation device enters the intersection coverage region, and the real-time navigation guidance image is provided according to the target three-dimensional real scene data so that an image does not need to be generated for each piece of real-time positioning information, accurate guidance information can be selectively provided at a key location, and redundant image data can be reduced while accurate navigation is provided, thereby reducing image generation operations and improving guidance generation efficiency.

Optionally, the method for navigation guidance further includes: in response to detecting, according to the real-time positioning information, that the navigation device enters the intersection coverage region, displaying the real-time navigation guidance image; and in response to detecting, according to the real-time positioning information, that the navigation device leaves the intersection coverage region, stopping displaying the real-time navigation guidance image.

In the case where an electronic device that performs the method for navigation guidance according to the embodiment of the present disclosure is the navigation device, the real-time navigation guidance image may be displayed only when the navigation device enters the intersection coverage region, real-time navigation guidance images matching all pieces of real-time positioning information may be continuously displayed in a process of traveling in the intersection coverage region; and the display of the real-time navigation guidance image is stopped when the navigation device leaves the intersection coverage region.

More specifically, that the navigation device enters the intersection coverage region may refer to that the navigation device arrives at a location where the distance from the navigation device to a first intersection in the intersection coverage region is a first distance threshold. Exemplarily, the first distance threshold is 200 meters, 150 meters or the like. That the navigation device leaves the intersection coverage region may refer to that the navigation device arrives at a location where the distance from the navigation device to a last intersection in the intersection coverage region is a second distance threshold. Exemplarily, the second distance threshold is 100 meters, 50 meters or the like. The first distance threshold may be the same as the second distance threshold, and the first intersection may be the same as or different from the last intersection.

In response to the navigation device entering the intersection coverage region, the display of the real-time navigation guidance image is triggered, and in response to the navigation device leaving the intersection coverage region, the display of the real-time navigation guidance image is triggered to be stopped so that a navigation guidance image can be displayed for the intersection coverage region, the accurate guidance information can be selectively provided in the intersection coverage region, and the redundant image data can be reduced while the accurate navigation is provided, thereby reducing the image generation operations and reasonably configuring resources of a navigation task.

Optionally, an observation viewing angle configured in correspondence to each keypoint in the intersection coverage region is determined according to a distance between the each keypoint and an intersection, and a size of an observation range of the observation viewing angle is negatively correlated to the distance between the each keypoint and the intersection.

In fact, a building overlaps a road or a road overlaps a road at the intersection, for example, an overpass. If a uniform observation range is used in the whole process, actual road conditions and road shapes of some intersections cannot be displayed in real-time navigation guidance images. Therefore, the observation viewing angle needs to be adjusted and thus a blocked region is adjusted to be within the observation range so that intersection information is clearly and accurately expressed in the real-time navigation guidance images and intersection guidance information is shown in advance to a user.

A method for configuring an observation viewing angle corresponding to a keypoint may be detecting a distance between the keypoint and an intersection and adjusting an observation parameter corresponding to the observation viewing angle to adjust an observation range of the observation viewing angle. The negative correlation between a size of the observation range and the distance between the each keypoint and the intersection may be that when the distance between the keypoint and the intersection is relatively smaller, the observation parameter may be adjusted for a larger observation range, and when the distance between the keypoint and the intersection is relatively larger, the observation parameter may be adjusted for a smaller observation range. In a specific example, the observation range may be increased by increasing a height of a camera, increasing a pitch angle, and decreasing a scale; and the observation range may be reduced by reducing the height of the camera, reducing the pitch angle, and increasing the scale. Additionally, it may also be set that when the distance between the keypoint and the intersection is less than a set threshold, the observation parameter remains unchanged so that the observation range is unchanged.

Figure 5:
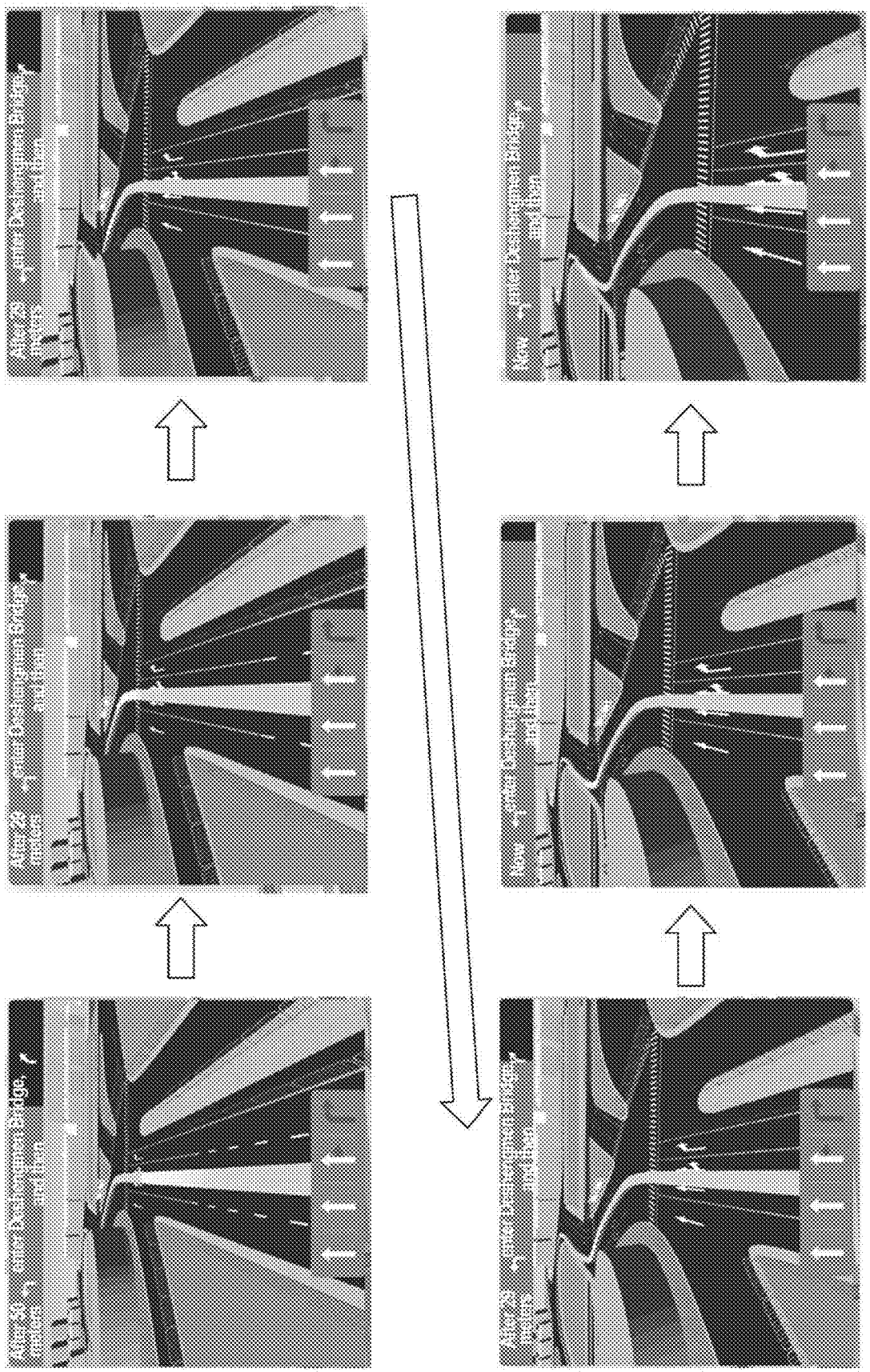
FIG. 5 is a schematic diagram of real-time navigation guidance images according to an embodiment of the present disclosure.
Figure 6:
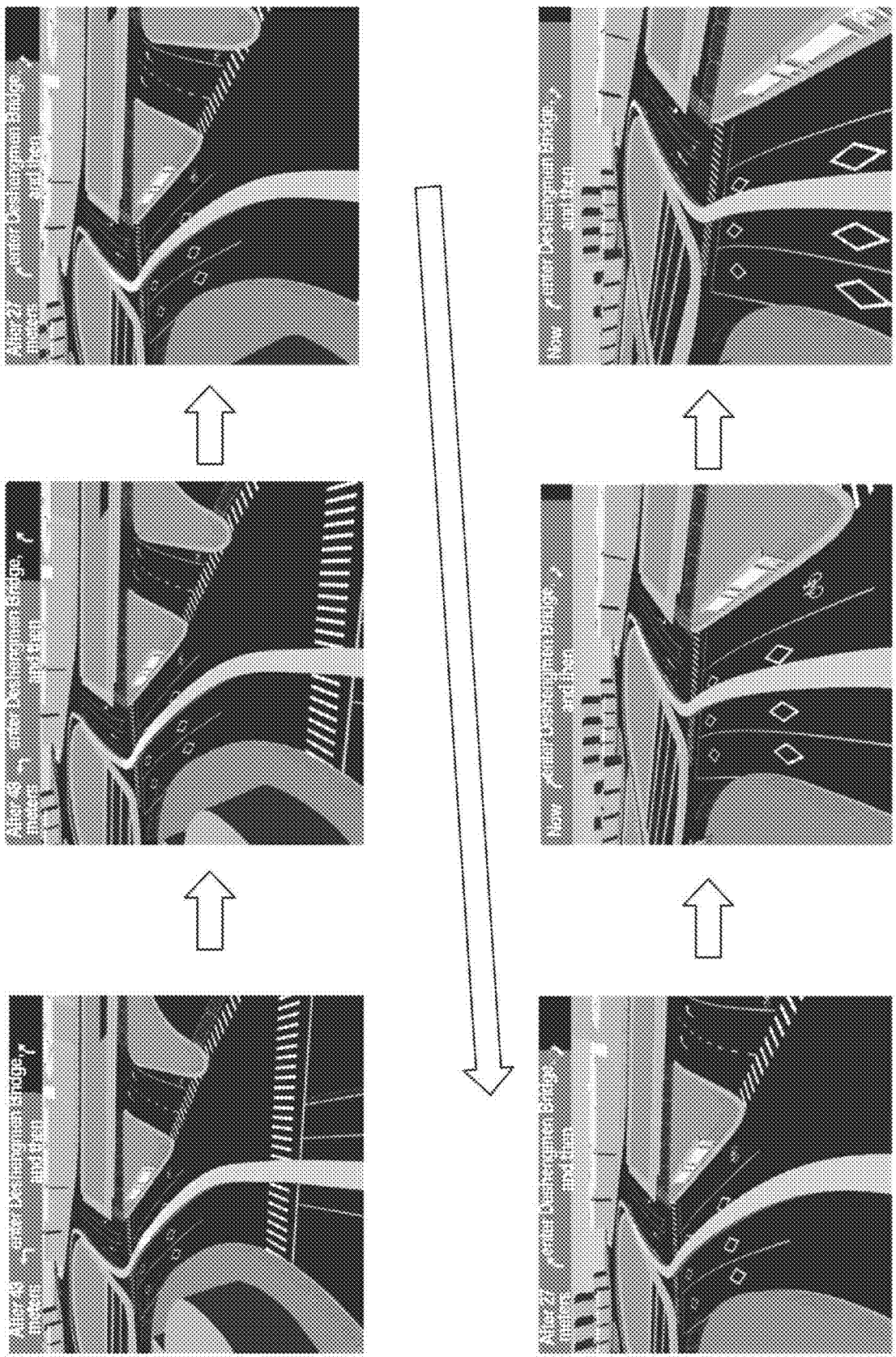
FIG. 6 is a schematic diagram of real-time navigation guidance images according to an embodiment of the present disclosure.

Therefore, when the navigation device travels along keypoints of the virtual navigation road, the distance between the navigation device and the intersection becomes smaller, the observation range is gradually increased, and a current observation parameter is maintained and the observation range stops to be increased when the distance between the navigation device and the intersection is less than the set threshold; when the distance between the navigation device and the intersection becomes larger, the observation range is gradually reduced. In this manner, the effect of jumping up before the navigation device arrives at the intersection and falling back after the navigation device passes through the intersection can be achieved. In a specific example, as shown in FIG. 5, the navigation device travels along the navigation route, and a sequence of corresponding real-time navigation guidance images is shown by an arrow direction in FIG. 5. It can be seen that when the navigation device arrives at a complex intersection, the intersection in the front is observed at a relatively high viewing angle so that the effect of jumping up before the intersection is achieved. As shown in FIG. 6, the navigation device travels along the navigation route, and a sequence of corresponding real-time navigation guidance images is shown by an arrow direction in FIG. 6. It can be seen that when the navigation device leaves the complex intersection shown in FIG. 5, the intersection in the front is observed at a relatively low viewing angle so that the effect of falling back after the intersection is achieved.

In fact, the intersection coverage region includes multiple intersections, the observation parameter may be changed for observation viewing angles corresponding to keypoints of each intersection; or the intersections may be classified and the observation parameter may be changed for observation viewing angles corresponding to keypoints in a complex intersection region formed by multiple consecutive complex intersections and according to a distance between each of the keypoints and the complex intersection region, and the observation parameter remains unchanged for other intersections. Changing the observation parameter according to the distance between the each of the keypoints and the complex intersection region may be as follows: when a distance between a keypoint and a first intersection in the complex intersection region becomes smaller, the observation parameters of the keypoints are adjusted in descending order of the distance, and the observation range is gradually increased; and when a distance between a keypoint and a last intersection in the complex intersection region becomes larger, the observation parameters of the keypoints are adjusted in ascending order of the distance, and the observation range is gradually reduced.

The intersection coverage region may include an ordinary intersection region and a complex intersection region. The ordinary intersection region may refer to an intersection region including at least one of a relatively small number of intersections, intersections with relatively long distances, intersections with simple road shapes or intersections with simple road conditions. The complex intersection region may refer to an intersection region including at least one of a relatively large number of intersections, intersections with relatively short distances, intersections with complex road shapes or intersections with complex road conditions. For example, an intersection region with a relatively large number of intersections includes at least two intersections. Optionally, the number of intersections is at least three. A region of intersections with relatively short distances may refer to an intersection region where an average distance between every two intersections is smaller than a set distance threshold, for example, 100 meters. A region of intersections with complex road shapes may include at least two consecutive intersections with different turnings (for example, turning left at a first intersection and turning right at a second intersection), at least two consecutive intersections with different types of slopes (for example, going up a slope at a first intersection and going down a slope at a second intersection) or at least one intersection whose road shape is difficult to discriminate (which may refer to dense blocks or many interference elements) within a short distance. The intersections with complex road shapes are generally determined according to the navigation route. A region of intersections with complex road conditions may include an intersection with a high level of congestion, which refers to, for example, the time taken for the same vehicle to travel a specified distance. For example, the time to travel 100 meters is calculated, and a longer time indicates a higher level of congestion. Generally, when the observation range cannot satisfy an inductive demonstration requirement through interpolation adjustment in the complex intersection region, the observation parameter is intelligently adjusted according to the complexity of a scenario to present guidance information of a larger range so that guidance information of the front or even further can be completely presented to the user who drives a vehicle. In an extreme scenario, the complex intersection region may be expressed with a top observation viewing angle, and an initial observation viewing angle, that is, an observation viewing angle before the top observation viewing angle, is automatically restored after the navigation device leaves the complex region. Additionally, the whole video may still be smoothly played in an interpolation manner, presenting an effect of jumping up and then falling back.

Some blocked regions are adjusted to be within the observation range according to the keypoints so that the intersection information is clearly and accurately expressed in the real-time navigation guidance image, the intersection guidance information is shown in advance to the user, and the integrity and clarity of the intersection guidance information are improved, thereby improving the accuracy of the intersection guidance information.

According to the solution of the present disclosure, the target three-dimensional real scene data accurately matching the real-time positioning information is acquired only when the navigation device enters the intersection coverage region, and the real-time navigation guidance image is generated so that images accurately matching locations can be generated one by one, the accurate navigation is implemented, the accurate guidance information can be selectively provided at the key location, and the redundant image data can be reduced while the accurate navigation is provided, thereby reducing the image generation operations and improving the guidance generation efficiency.

Figure 7:
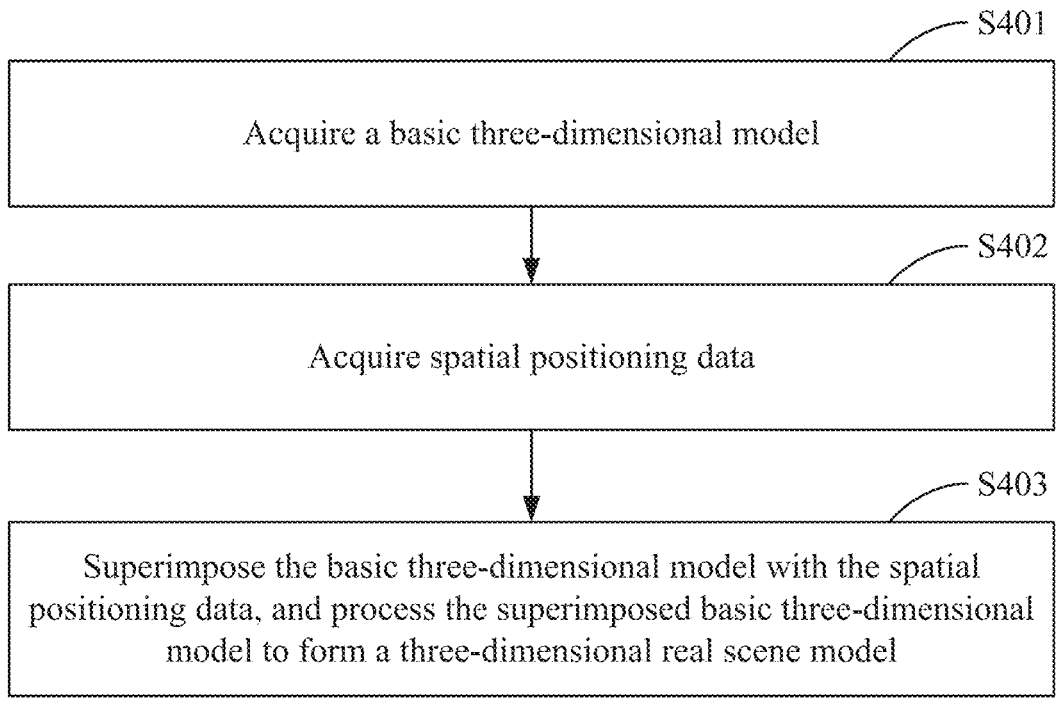
FIG. 7 is a schematic diagram of a method for establishing a three-dimensional real scene model according to an embodiment of the present disclosure.

FIG. 7 is a flowchart of a method for establishing a three-dimensional real scene model according to an embodiment of the present disclosure. This embodiment is applicable to the case where a three-dimensional real scene model with additional geographic location information is established. The method of this embodiment may be performed by an apparatus for establishing a three-dimensional real scene model. The apparatus may be implemented by software and/or hardware and is configured in an electronic device having a certain data computing capability. The electronic device may be a client device or a server device.

In S401, a basic three-dimensional model is acquired. The basic three-dimensional model is a model established according to real scenes in multiple intersection coverage regions.

The basic three-dimensional model is a three-dimensional model including the real scenes in the multiple intersection coverage regions. The basic three-dimensional model is configured with no geographic location information. The basic three-dimensional model may be artificial modeling or may be real scene data obtained through image collection on the real scenes by means of tilt photogrammetry or laser radar measurement. The basic three-dimensional model is fused so that the three-dimensional real scene model is formed.

In S402, spatial positioning data is acquired.

The spatial positioning data may be obtained through a GNSS. Optionally, the spatial positioning data may be a satellite map. The spatial positioning data may include at least one of a longitude, a latitude, an altitude or the like.

In S403, the basic three-dimensional model is superimposed with the spatial positioning data, and the superimposed basic three-dimensional model is processed so that the three-dimensional real scene model is formed. The three-dimensional real scene model includes location information, three-dimensional model data and observation viewing angles and is used for determining candidate three-dimensional real scene data corresponding to a navigation route of a navigation device, where the candidate three-dimensional real scene data is used for generating a real-time navigation guidance image according to real-time positioning information of the navigation device.

The basic three-dimensional model is superimposed with the spatial positioning data so that the spatial positioning data with additional actual geographic location information can be obtained. For example, the basic three-dimensional model includes background model data, and the superimposed basic three-dimensional model includes the background model data and location information corresponding to the background model data.

Processing the superimposed basic three-dimensional model may refer to adding data associated with a navigation application scenario to the superimposed basic three-dimensional model, so as to quickly acquire the candidate three-dimensional real scene data corresponding to the navigation route of the navigation device and generate the real-time navigation guidance image. For example, the data associated with the navigation application scenario may include virtual navigation roads that may exist, a keypoint configured for each virtual navigation road, an observation viewing angle corresponding to the keypoint, and an induction arrow model material corresponding to the navigation route and on each virtual navigation road and the like. The induction arrow model material is used for determining induction arrow model data.

The three-dimensional model data includes the background model data included in the original basic three-dimensional model and induction arrow model data formed through post-processing. The location information includes the location information corresponding to the background model data and included in the superimposed basic three-dimensional model and location information corresponding to the induction arrow model data formed through post-processing. The observation viewing angles are generated after the superimposed basic three-dimensional model is processed.

Optionally, the step of processing the superimposed basic three-dimensional model includes steps described below. For each intersection coverage region among the multiple intersection coverage regions, all nodes in the each intersection coverage region are traversed, two nodes are selected from all the nodes as an ingress node and an egress node, respectively, and multiple virtual navigation roads are generated, where the ingress node serves as a start point of the multiple virtual navigation roads and the egress node serves as an end point of the multiple virtual navigation roads. Multiple keypoints are configured for each of the multiple virtual navigation roads, and an observation viewing angle corresponding to each keypoint among the multiple keypoints is configured according to a distance between the each keypoint and each intersection in the each intersection coverage region. The induction arrow model material is configured, where the basic three-dimensional model is configured with the background model data, and the superimposed basic three-dimensional model includes the location information corresponding to the background model data. The induction arrow model material and location information of the multiple keypoints of the each of the multiple virtual navigation roads are used as induction arrow model data and location information corresponding to the induction arrow model data for the each of the multiple virtual navigation roads, the background model data and induction arrow model data of the multiple virtual navigation roads are used as the three-dimensional model data in the three-dimensional real scene model, the location information corresponding to the background model data and location information corresponding to the induction arrow model data of the multiple virtual navigation roads are used as the location information in the three-dimensional real scene model, and observation viewing angles corresponding to the multiple keypoints of the each of the multiple virtual navigation roads are used as the observation viewing angles in the three-dimensional real scene model.

One intersection coverage region may include multiple ingress nodes and multiple egress nodes. All nodes may be traversed for each intersection coverage region and two nodes may be selected, where one node serves as the ingress node and the other node serves as the egress node. Multiple virtual navigation roads are formed, where each virtual navigation road represents an application scenario of one navigation route which enters the intersection coverage region from the ingress node and leaves the intersection coverage region from the egress node. The nodes are coordinate points pre-configured on roads in the intersection coverage region.

Multiple keypoints are configured for the virtual navigation road and may be configured at a set distance. For example, dense keypoints are configured on a virtual road of a complex intersection region that overlaps the virtual navigation road and configured at a smaller distance. Sparse keypoints are configured on a virtual road of an ordinary intersection region that overlaps the virtual navigation road and configured at a larger distance. For each keypoint, the observation viewing angle corresponding to the keypoint may be configured according to whether the keypoint is in the complex intersection region and the distance between the keypoint and the complex intersection region. Configuring the observation viewing angle is configuring an observation parameter.

The induction arrow model material is used as the induction arrow model data for the virtual navigation road, and the location information of the keypoints of the virtual navigation road is used as the location information corresponding to the induction arrow model data. Different virtual navigation roads may be configured with different induction arrow model materials.

Multiple navigation application scenarios are configured in the superimposed basic three-dimensional model, the multiple virtual navigation roads are configured correspondingly, and the keypoints, the observation viewing angles corresponding to the keypoints and an arrow model material are configured for each virtual navigation road and processed so that the three-dimensional real scene model including locations, a model and observation viewing angles is obtained, increasing information richness of the three-dimensional real scene model, facilitating cloud pulling, analysis and application, shortening a request response time of model data, and improving model data processing efficiency.

According to the solution of the present disclosure, spatial coordinate data is superimposed with the basic three-dimensional model and the superimposed basic three-dimensional model is processed so that the three-dimensional real scene model is formed, facilitating subsequent cloud pulling, analysis and application, shortening a response time in the navigation application scenario, and improving processing efficiency of navigation application data. Moreover, a correspondence between the three-dimensional model data and the location information as well as the observation viewing angles is established so that accurate model data can be acquired according to a location and an image is rendered and generated, improving the guidance accuracy of a guidance image.

Figure 8:
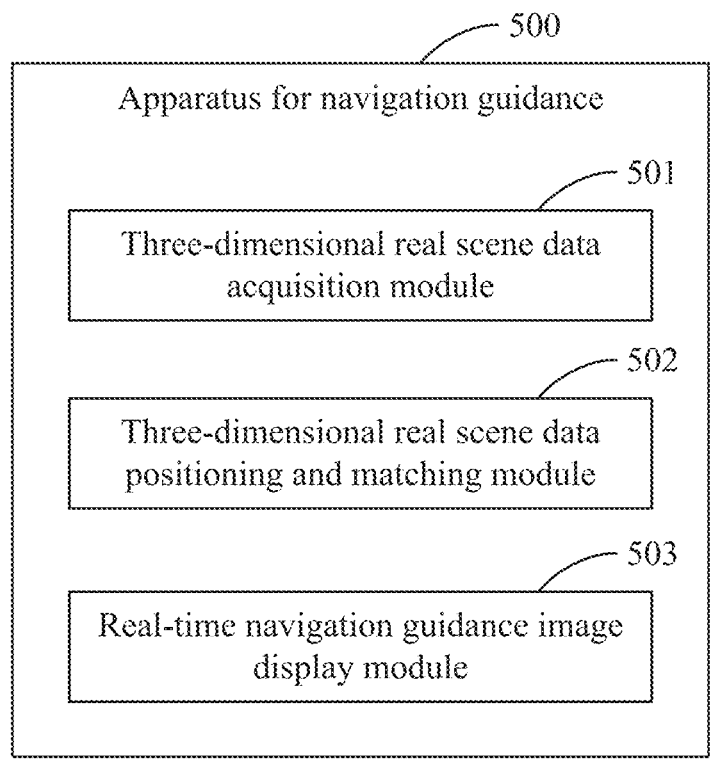
FIG. 8 is a schematic diagram of an apparatus for navigation guidance according to an embodiment of the present disclosure.

According to an embodiment of the present disclosure, FIG. 8 is a structure diagram of an apparatus for navigation guidance according to an embodiment of the present disclosure. The embodiment of the present disclosure is applicable to the case where a real-time navigation guidance image is generated according to a real-time location of a navigation device. The apparatus is implemented by software and/or hardware and configured in an electronic device having a certain data computing capability.

As shown in FIG. 8, the apparatus 500 for navigation guidance includes a three-dimensional real scene data acquisition module 501, a three-dimensional real scene data positioning and matching module 502 and a real-time navigation guidance image display module 503.

The three-dimensional real scene data acquisition module 501 is configured to determine a navigation route of the navigation device and candidate three-dimensional real scene data corresponding to the navigation route. The candidate three-dimensional real scene data includes candidate location information, candidate three-dimensional model data and a candidate observation viewing angle.

The three-dimensional real scene data positioning and matching module 502 is configured to match real-time positioning information of the navigation device with the candidate location information in the candidate three-dimensional real scene data to obtain target three-dimensional real scene data.

The real-time navigation guidance image display module 503 is configured to simulate target three-dimensional model data in the target three-dimensional real scene data at a target observation viewing angle in the target three-dimensional real scene data and at a location corresponding to the real-time positioning information to obtain the real-time navigation guidance image.

According to the solution of the present disclosure, the navigation route of the navigation device and the candidate three-dimensional real scene data corresponding to the navigation route are determined, and the target three-dimensional real scene data matching the real-time positioning information is queried from the candidate three-dimensional real scene data in real time according to the real-time positioning information of the navigation device so that the real-time navigation guidance image is formed, thereby accurately matching the real-time positioning information with the real-time navigation guidance image. In this manner, a dynamic location of the navigation device is sensed and the real-time navigation guidance image accurately matched is generated in real time according to a dynamically changing location so that navigation guidance is accurately matched with an actual driving behavior, thereby improving the accuracy of navigation information and a navigation guidance effect.

Further, the three-dimensional real scene data acquisition module 501 includes a virtual navigation road binding unit and a candidate three-dimensional real scene data determination unit. The virtual navigation road binding unit is configured to map the navigation route to a pre-configured three-dimensional real scene model to obtain a virtual navigation road of the navigation device. The candidate three-dimensional real scene data determination unit is configured to determine the candidate three-dimensional real scene data corresponding to the navigation route based on location information of a keypoint of the virtual navigation road and an observation viewing angle configured in correspondence to the keypoint.

Further, the candidate three-dimensional real scene data determination unit is configured to: determine induction arrow model data and location information corresponding to the induction arrow model data according to a preset induction arrow model material and the location information of the keypoint of the virtual navigation road; and use background model data in the three-dimensional real scene model and the induction arrow model data as the candidate three-dimensional model data in the candidate three-dimensional real scene data, use the location information corresponding to the induction arrow model data and location information corresponding to the background model data in the three-dimensional real scene model as the candidate location information in the candidate three-dimensional real scene data, and use the observation viewing angle configured in correspondence to the keypoint of the virtual navigation road as the candidate observation viewing angle in the candidate three-dimensional real scene data.

Further, the three-dimensional real scene data positioning and matching module 502 includes an observation viewing angle matching unit, a model data matching unit and a target three-dimensional real scene data determination unit. The observation viewing angle matching unit is configured to: in response to determining, according to the real-time positioning information of the navigation device, that the navigation device enters an intersection coverage region, determine an observation viewing angle matching the real-time positioning information according to a relationship between the real-time positioning information and location information of each keypoint and an observation viewing angle configured in correspondence to the each keypoint. The model data matching unit is configured to query, according to the candidate location information, background model data and induction arrow model data matching the real-time positioning information from the candidate three-dimensional real scene data. The target three-dimensional real scene data determination unit is configured to determine the background model data, the induction arrow model data and the observation viewing angle matching the real-time positioning information as the target three-dimensional real scene data matching the real-time positioning information.

Further, the observation viewing angle matching unit is configured to: in the case where the real-time positioning information is the same as location information of a first target keypoint, acquire a candidate observation viewing angle corresponding to the first target keypoint as the observation viewing angle matching the real-time positioning information; in the case where the real-time positioning information is between two second target keypoints, perform interpolation between the two second target keypoints of the virtual navigation road to form multiple interpolated coordinate points, and perform interpolation between candidate observation viewing angles corresponding to the two second target keypoints to form candidate observation viewing angles corresponding to the multiple interpolated coordinate points; and query a target interpolated coordinate point that is the same as the real-time positioning information from the multiple interpolated coordinate points, and use a candidate observation viewing angle corresponding to the target interpolated coordinate point as the observation viewing angle matching the real-time positioning information.

Further, an observation viewing angle configured in correspondence to each keypoint in the intersection coverage region is determined according to a distance between the each keypoint and an intersection, and a size of an observation range of the observation viewing angle is negatively correlated to the distance between the each keypoint and the intersection.

Further, the apparatus for navigation guidance further includes a real-time navigation guidance image trigger module. The real-time navigation guidance image trigger module is configured to: in response to detecting, according to the real-time positioning information, that the navigation device enters the intersection coverage region, display the real-time navigation guidance image; and in response to detecting, according to the real-time positioning information, that the navigation device leaves the intersection coverage region, stop displaying the real-time navigation guidance image.

Further, the apparatus for navigation guidance further includes a driving state matching module. The driving state matching module is configured to acquire a real-time driving speed and a real-time driving acceleration and adjust a switching speed of the real-time navigation guidance image according to the real-time driving speed and the real-time driving acceleration. The switching speed is the speed of switching from a current real-time navigation guidance image to a next real-time navigation guidance image.

The preceding apparatus for navigation guidance may perform the method for navigation guidance according to any embodiment of the present disclosure and has function modules and beneficial effects corresponding to the execution of the method for navigation guidance.

Figure 9:
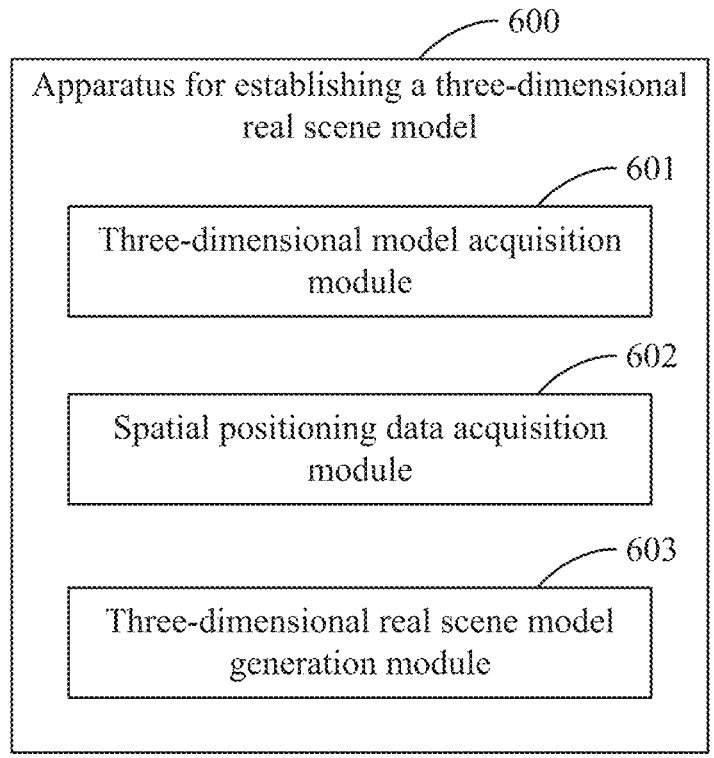
FIG. 9 is a schematic diagram of an apparatus for establishing a three-dimensional real scene model according to an embodiment of the present disclosure.

According to an embodiment of the present disclosure, FIG. 9 is a structure diagram of an apparatus for establishing a three-dimensional real scene model according to an embodiment of the present disclosure. The embodiment of the present disclosure is applicable to the case where the three-dimensional real scene model is established. The apparatus is implemented by software and/or hardware and configured in an electronic device having a certain data computing capability.

As shown in FIG. 9, the apparatus 600 for establishing a three-dimensional real scene model includes a three-dimensional model acquisition module 601, a spatial positioning data acquisition module 602 and a three-dimensional real scene model generation module 603.

The three-dimensional model acquisition module 601 is configured to acquire a basic three-dimensional model. The basic three-dimensional model is a model established according to real scenes in multiple intersection coverage regions.

The spatial positioning data acquisition module 602 is configured to acquire spatial positioning data.

The three-dimensional real scene model generation module 603 is configured to superimpose the basic three-dimensional model with the spatial positioning data and process the superimposed basic three-dimensional model to form the three-dimensional real scene model. The three-dimensional real scene model includes location information, three-dimensional model data and observation viewing angles and is used for determining candidate three-dimensional real scene data corresponding to a navigation route of a navigation device, where the candidate three-dimensional real scene data is used for generating a real-time navigation guidance image according to real-time positioning information of the navigation device.

Further, the three-dimensional real scene model generation module 603 includes a virtual navigation road generation unit, a unit for configuring keypoints for a road, an induction arrow model material configuration unit and a unit for determining data in the three-dimensional real scene model. The virtual navigation road generation unit is configured to: for each intersection coverage region among the multiple intersection coverage regions, traverse all nodes in the each intersection coverage region, select two nodes from all the nodes as an ingress node and an egress node, respectively, and generate multiple virtual navigation roads. The ingress node serves as a start point of the multiple virtual navigation roads and the egress node serves as an end point of the multiple virtual navigation roads. The unit for configuring keypoints for a road is configured to configure multiple keypoints for each of the multiple virtual navigation roads and configure an observation viewing angle corresponding to each keypoint among the multiple keypoints according to a distance between the each keypoint and each intersection in the each intersection coverage region. The induction arrow model material configuration unit is configured to configure an induction arrow model material. The basic three-dimensional model is configured with background model data, and the superimposed basic three-dimensional model includes location information corresponding to the background model data. The unit for determining data in the three-dimensional real scene model is configured to use the induction arrow model material and location information of the multiple keypoints of the each of the multiple virtual navigation roads as induction arrow model data and location information corresponding to the induction arrow model data for the each of the multiple virtual navigation roads, use the background model data and induction arrow model data of the multiple virtual navigation roads as the three-dimensional model data in the three-dimensional real scene model, use the location information corresponding to the background model data and location information corresponding to the induction arrow model data of the multiple virtual navigation roads as the location information in the three-dimensional real scene model, and use observation viewing angles corresponding to the multiple keypoints of the each of the multiple virtual navigation roads as the observation viewing angles in the three-dimensional real scene model.

The preceding apparatus for establishing a three-dimensional real scene model may perform the method for establishing a three-dimensional real scene model according to any embodiment of the present disclosure and has function modules and beneficial effects corresponding to the execution of the method for establishing a three-dimensional real scene model.

According to embodiments of the present disclosure, the present disclosure further provides an electronic device, a readable storage medium and a computer program product.

Figure 10:
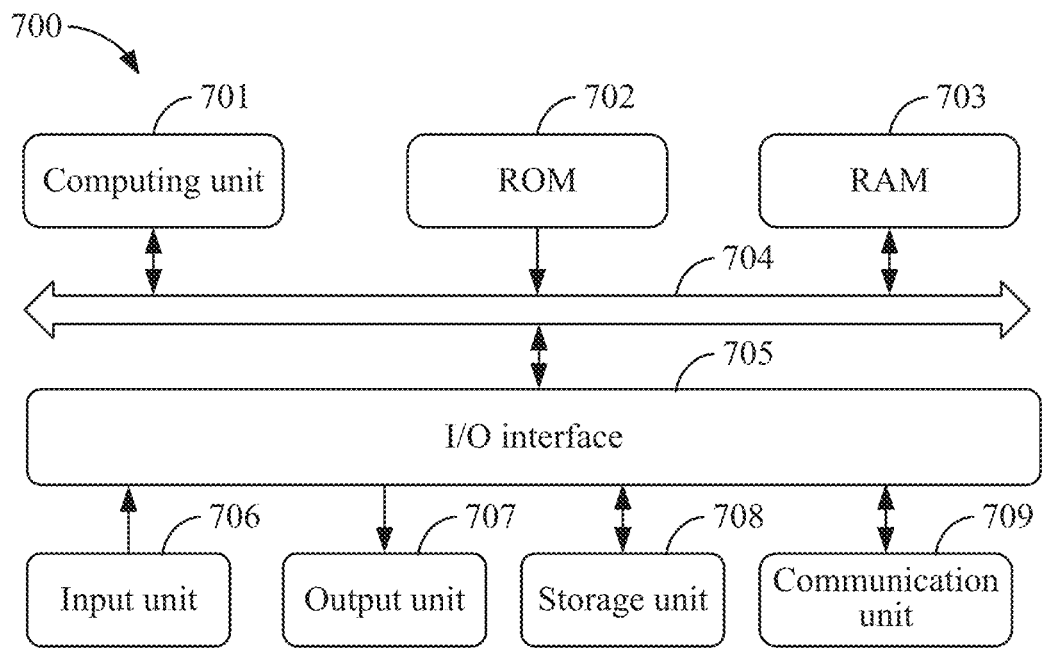
FIG. 10 is a block diagram of an electronic device for implementing a method for navigation guidance or a method for establishing a three-dimensional real scene model according to an embodiment of the present disclosure.

FIG. 10 is a block diagram illustrative of an exemplary electronic device 700 that may be used for implementing embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein. The electronic device may be a mobile phone or a transportation device (such as a car).

As shown in FIG. 10, the device 700 includes a computing unit 701. The computing unit 701 may perform various types of appropriate operations and processing based on a computer program stored in a read-only memory (ROM) 702 or a computer program loaded from a storage unit 708 to a random-access memory (RAM) 703. Various programs and data required for operations of the device 700 may also be stored in the RAM 703. The computing unit 701, the ROM 702 and the RAM 703 are connected to each other through a bus 704. An input/output (I/O) interface 705 is also connected to the bus 704.

Multiple components in the device 700 are connected to the I/O interface 705. The multiple components include an input unit 706 such as a keyboard and a mouse, an output unit 707 such as various types of displays and speakers, the storage unit 708 such as a magnetic disk and an optical disk, and a communication unit 709 such as a network card, a modem or a wireless communication transceiver. The communication unit 709 allows the device 700 to exchange information/data with other devices over a computer network such as the Internet and/or various telecommunications networks.

The computing unit 701 may be various general-purpose and/or dedicated processing components having processing and computing capabilities. Some examples of the computing unit 701 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers and microcontrollers. The computing unit 701 performs various methods and processing described above, such as the method for navigation guidance or the method for establishing a three-dimensional real scene model. For example, in some embodiments, the method for navigation guidance or the method for establishing a three-dimensional real scene model may be implemented as a computer software program tangibly contained in a machine-readable medium such as the storage unit 708. In some embodiments, part or all of a computer program may be loaded and/or installed on the device 700 via the ROM 702 and/or the communication unit 709. When the computer program is loaded to the RAM 703 and executed by the computing unit 701, one or more steps of the preceding method for navigation guidance or the preceding method for establishing a three-dimensional real scene model may be performed. Alternatively, in other embodiments, the computing unit 701 may be configured, in any other suitable manner (for example, by means of firmware), to perform the method for navigation guidance or the method for establishing a three-dimensional real scene model.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the methods of the present disclosure may be compiled in any combination of one or more programming languages. These program codes may be provided for a processor or controller of a general-purpose computer, a dedicated computer or another programmable data processing apparatus such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with a system, apparatus or device that executes instructions. The machine-readable medium may be a machine-readable signal medium or a machine-readable storage medium. Machine-readable media may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

The computing system may include clients and servers. A client and a server are generally remote from each other and typically interact through a communication network. The relationship between the client and the server arises by virtue of computer programs running on respective computers and having a client-server relationship to each other.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. A method for navigation guidance, comprising:
    determining, by an electronic device, a navigation route of a navigation device and candidate three-dimensional real scene data corresponding to the navigation route; wherein the candidate three-dimensional real scene data comprises candidate location information, candidate three-dimensional model data and a candidate observation viewing angle;
    matching, by the electronic device, real-time positioning information of the navigation device with the candidate location information in the candidate three-dimensional real scene data to obtain target three-dimensional real scene data; and
    simulating, by the electronic device, target three-dimensional model data in the target three-dimensional real scene data at a target observation viewing angle in the target three-dimensional real scene data and at a location corresponding to the real-time positioning information to obtain a real-time navigation guidance image, wherein the real-time navigation guidance image is rendered and generated using the candidate three-dimensional real scene data according to the real-time positioning information of the navigation device;
    wherein determining, by the electronic device, the candidate three-dimensional real scene data corresponding to the navigation route comprises:
        mapping, by the electronic device, the navigation route to a pre-configured three-dimensional real scene model to obtain a virtual navigation road of the navigation device; and
        determining, by the electronic device, the candidate three-dimensional real scene data corresponding to the navigation route based on location information of a keypoint of the virtual navigation road and an observation viewing angle configured in correspondence to the keypoint;
    wherein determining, by the electronic device, the candidate three-dimensional real scene data corresponding to the navigation route based on the location information of the keypoint of the virtual navigation road and the observation viewing angle configured in correspondence to the keypoint comprises:
        determining, by the electronic device, induction arrow model data and location information corresponding to the induction arrow model data according to a preset induction arrow model material and the location information of the keypoint of the virtual navigation road; and using, by the electronic device, background model data in the three-dimensional real scene model and the induction arrow model data as the candidate three-dimensional model data in the candidate three-dimensional real scene data, using, by the electronic device, the location information corresponding to the induction arrow model data and location information corresponding to the background model data in the three-dimensional real scene model as the candidate location information in the candidate three-dimensional real scene data, and using, by the electronic device, the observation viewing angle configured in correspondence to the keypoint of the virtual navigation road as the candidate observation viewing angle in the candidate three-dimensional real scene data; and wherein the method further comprising:

acquiring, by the electronic device, a real-time driving speed and a real-time driving acceleration; and adjusting, by the electronic device, a switching speed of the real-time navigation guidance image according to the real-time driving speed and the real-time driving acceleration; wherein the switching speed is a speed of switching from a current real-time navigation guidance image to a next real-time navigation guidance image.

2. The method of claim 1, wherein matching, by the electronic device, the real-time positioning information of the navigation device with the candidate location information in the candidate three-dimensional real scene data to obtain the target three-dimensional real scene data comprises:

in response to determining, by the electronic device, according to the real-time positioning information of the navigation device, that the navigation device enters an intersection coverage region, determining, by the electronic device, an observation viewing angle matching the real-time positioning information according to a relationship between the real-time positioning information and location information of each keypoint and a candidate observation viewing angle configured in correspondence to the each keypoint;

querying, by the electronic device, according to the candidate location information, the background model data and the induction arrow model data matching the real-time positioning information from the candidate three-dimensional real scene data; and determining, by the electronic device, the background model data, the induction arrow model data and the observation viewing angle matching the real-time positioning information as the target three-dimensional real scene data matching the real-time positioning information.

3. The method of claim 2, wherein determining, by the electronic device, the observation viewing angle matching the real-time positioning information according to the relationship between the real-time positioning information and the location information of the each keypoint and the candidate observation viewing angle configured in correspondence to the each keypoint comprises:

in response to the real-time positioning information being the same as location information of a first target keypoint, acquiring, by the electronic device, a candidate observation viewing angle corresponding to the first target keypoint as the observation viewing angle matching the real-time positioning information; and in response to the real-time positioning information being between two second target keypoints, performing, by the electronic device, interpolation between the two second target keypoints of the virtual navigation road to form a plurality of interpolated coordinate points, and performing, by the electronic device, interpolation between candidate observation viewing angles corresponding to the two second target keypoints to form candidate observation viewing angles corresponding to the plurality of interpolated coordinate points; and querying, by the electronic device, a target interpolated coordinate point that is the same as the real-time positioning information from the plurality of interpolated coordinate points, and using, by the electronic device, a candidate observation viewing angle corresponding to the target interpolated coordinate point as the observation viewing angle matching the real-time positioning information.

4. The method of claim 2, wherein an observation viewing angle configured in correspondence to each keypoint in the intersection coverage region is determined, by the electronic device, according to a distance between the each keypoint and an intersection, and a size of an observation range of the observation viewing angle is negatively correlated to the distance between the each keypoint and the intersection.

5. The method of claim 2, further comprising:

in response to detecting, by the electronic device, according to the real-time positioning information, that the navigation device enters the intersection coverage region, displaying, by the electronic device, the real-time navigation guidance image; and in response to detecting, by the electronic device, according to the real-time positioning information, that the navigation device leaves the intersection coverage region, stopping displaying, by the electronic device, the real-time navigation guidance image.

6. A method for establishing a three-dimensional real scene model, comprising:

acquiring, by an electronic device, a basic three-dimensional model, wherein the basic three-dimensional model is a model established according to real scenes in a plurality of intersection coverage regions;

acquiring, by the electronic device, spatial positioning data; and superimposing, by the electronic device, the basic three-dimensional model with the spatial positioning data, and processing, by the electronic device, the superimposed basic three-dimensional model to form the three-dimensional real scene model, wherein the three-dimensional real scene model comprises location information, three-dimensional model data and observation viewing angles, and the three-dimensional real scene model is used for determining, by the electronic device, candidate three-dimensional real scene data corresponding to a navigation route of a navigation device, wherein the candidate three-dimensional real scene data is used for rendering and generating, by the electronic device, a real-time navigation guidance image according to real-time positioning information of the navigation device;

wherein background model data in the three-dimensional real scene model and induction arrow model data are used as candidate three-dimensional model data in the candidate three-dimensional real scene data, location information corresponding to the background model data and location information corresponding to the induction arrow model data are used as candidate location information in the candidate three-dimensional real scene data, and an observation viewing angle configured in correspondence to a keypoint of a virtual navigation road is used as a candidate observation viewing angle in the candidate three-dimensional real scene data;

wherein the induction arrow model data and the location information corresponding to the induction arrow model data are determined according to a preset induction arrow model material and location information of the keypoint of the virtual navigation road;

wherein the virtual navigation road is obtained by mapping the navigation route to a pre-configured three-dimensional real scene model;

wherein a switching speed of the real-time navigation guidance image is adjusted according to a real-time driving speed and a real-time driving acceleration; and wherein the switching speed is a speed of switching from a current real-time navigation guidance image to a next real-time navigation guidance image.

7. The method of claim 6, wherein processing, by the electronic device, the superimposed basic three-dimensional model comprises:

for each intersection coverage region among the plurality of intersection coverage regions, traversing, by the electronic device, all nodes in the each intersection coverage region, selecting, by the electronic device, two nodes from all the nodes as an ingress node and an egress node, respectively, and generating, by the electronic device, a plurality of virtual navigation roads, wherein the ingress node serves as a start point of the plurality of virtual navigation roads and the egress node serves as an end point of the plurality of virtual navigation roads;

configuring, by the electronic device, a plurality of keypoints for each of the plurality of virtual navigation roads, and configuring, by the electronic device, an observation viewing angle corresponding to each keypoint among the plurality of keypoints according to a distance between the each keypoint and each intersection in the each intersection coverage region;

configuring, by the electronic device, an induction arrow model material, wherein the basic three-dimensional model is configured with the background model data, and the superimposed basic three-dimensional model comprises the location information corresponding to the background model data; and using, by the electronic device, the induction arrow model material and location information of the plurality of keypoints of the each of the plurality of virtual navigation roads as induction arrow model data and location information corresponding to the induction arrow model data for the each of the plurality of virtual navigation roads, respectively, using, by the electronic device, the background model data and induction arrow model data of the plurality of virtual navigation roads as the three-dimensional model data in the three-dimensional real scene model, using, by the electronic device, the location information corresponding to the background model data and location information corresponding to the induction arrow model data of the plurality of virtual navigation roads as the location information in the three-dimensional real scene model, and using, by the electronic device, observation viewing angles corresponding to the plurality of keypoints of the each of the plurality of virtual navigation roads as the observation viewing angles in the three-dimensional real scene model.

8. An electronic device, comprising:
at least one processor; and
a memory communicatively connected to the at least one processor;
wherein the memory stores instructions executable by the at least one processor, and the processor is configured to:

determine a navigation route of a navigation device and candidate three-dimensional real scene data corresponding to the navigation route; wherein the candidate three-dimensional real scene data comprises candidate location information, candidate three-dimensional model data and a candidate observation viewing angle;

match real-time positioning information of the navigation device with the candidate location information in the candidate three-dimensional real scene data to obtain target three-dimensional real scene data; and simulate target three-dimensional model data in the target three-dimensional real scene data at a target observation viewing angle in the target three-dimensional real scene data and at a location corresponding to the real-time positioning information to obtain a real-time navigation guidance image, wherein the real-time navigation guidance image is rendered and generated using the candidate three-dimensional real scene data according to the real-time positioning information of the navigation device;

wherein the processor is configured to determine the candidate three-dimensional real scene data corresponding to the navigation route in the following manners:

mapping the navigation route to a pre-configured three-dimensional real scene model to obtain a virtual navigation road of the navigation device; and determining the candidate three-dimensional real scene data corresponding to the navigation route based on location information of a keypoint of the virtual navigation road and an observation viewing angle configured in correspondence to the keypoint;

wherein the processor is configured to determine the candidate three-dimensional real scene data corresponding to the navigation route based on the location information of the keypoint of the virtual navigation road and the observation viewing angle configured in correspondence to the keypoint in the following manners:

determining induction arrow model data and location information corresponding to the induction arrow model data according to a preset induction arrow model material and the location information of the keypoint of the virtual navigation road; and using background model data in the three-dimensional real scene model and the induction arrow model data as the candidate three-dimensional model data in the candidate three-dimensional real scene data, using the location information corresponding to the induction arrow model data and location information corresponding to the background model data in the three-dimensional real scene model as the candidate location information in the candidate three-dimensional real scene data, and using the observation viewing angle configured in correspondence to the keypoint of the virtual navigation road as the candidate observation viewing angle in the candidate three-dimensional real scene data; and wherein the processor is further configured to:
acquire a real-time driving speed and a real-time driving acceleration; and
adjust a switching speed of the real-time navigation guidance image according to the real-time driving speed and the real-time driving acceleration; wherein the switching speed is a speed of switching from a current real-time navigation guidance image to a next real-time navigation guidance image;

or, the processor is configured to:
acquire a basic three-dimensional model, wherein the basic three-dimensional model is a model established according to real scenes in a plurality of intersection coverage regions;
acquire spatial positioning data; and
superimpose the basic three-dimensional model with the spatial positioning data, and process the superimposed basic three-dimensional model to form a three-dimensional real scene model, wherein the three-dimensional real scene model comprises location information, three-dimensional model data and observation viewing angles, and the three-dimensional real scene model is used for determining candidate three-dimensional real scene data corresponding to a navigation route of a navigation device, wherein the candidate three-dimensional real scene data is used for rendering and generating a real-time navigation guidance image according to real-time positioning information of the navigation device;

wherein background model data in the three-dimensional real scene model and induction arrow model data are used as candidate three-dimensional model data in the candidate three-dimensional real scene data, location information corresponding to the background model data and location information corresponding to the induction arrow model data are used as candidate location information in the candidate three-dimensional real scene data, and an observation viewing angle configured in correspondence to a keypoint of a virtual navigation road is used as a candidate observation viewing angle in the candidate three-dimensional real scene data;

wherein the induction arrow model data and the location information corresponding to the induction arrow model data are determined according to a preset induction arrow model material and location information of the keypoint of the virtual navigation road;

wherein the virtual navigation road is obtained by mapping the navigation route to a pre-configured three-dimensional real scene model;

wherein a switching speed of the real-time navigation guidance image is adjusted according to a real-time driving speed and a real-time driving acceleration; and wherein the switching speed is a speed of switching from a current real-time navigation guidance image to a next real-time navigation guidance image.

9. The electric device of claim 8, wherein the processor is configured to match the real-time positioning information of the navigation device with the candidate location information in the candidate three-dimensional real scene data to obtain the target three-dimensional real scene data in the following manners:
in response to determining, according to the real-time positioning information of the navigation device, that the navigation device enters an intersection coverage region, determining an observation viewing angle matching the real-time positioning information according to a relationship between the real-time positioning information and location information of each keypoint and a candidate observation viewing angle configured in correspondence to the each keypoint;
querying, according to the candidate location information, the background model data and the induction arrow model data matching the real-time positioning information from the candidate three-dimensional real scene data; and
determining the background model data, the induction arrow model data and the observation viewing angle matching the real-time positioning information as the target three-dimensional real scene data matching the real-time positioning information.

10. The electric device of claim 9, wherein the processor is configured to determine the observation viewing angle matching the real-time positioning information according to the relationship between the real-time positioning information and the location information of the each keypoint and the candidate observation viewing angle configured in correspondence to the each keypoint in the following manners:
in response to the real-time positioning information being the same as location information of a first target keypoint, acquiring a candidate observation viewing angle corresponding to the first target keypoint as the observation viewing angle matching the real-time positioning information; and
in response to the real-time positioning information being between two second target keypoints, performing interpolation between the two second target keypoints of the virtual navigation road to form a plurality of interpolated coordinate points, and performing interpolation between candidate observation viewing angles corresponding to the two second target keypoints to form candidate observation viewing angles corresponding to the plurality of interpolated coordinate points; and
querying a target interpolated coordinate point that is the same as the real-time positioning information from the plurality of interpolated coordinate points, and using a candidate observation viewing angle corresponding to the target interpolated coordinate point as the observation viewing angle matching the real-time positioning information.

11. The electric device of claim 9, wherein an observation viewing angle configured in correspondence to each keypoint in the intersection coverage region is determined according to a distance between the each keypoint and an intersection, and a size of an observation range of the observation viewing angle is negatively correlated to the distance between the each keypoint and the intersection.

12. The electric device of claim 9, wherein the processor is configured to:
in response to detecting, according to the real-time positioning information, that the navigation device enters the intersection coverage region, display the real-time navigation guidance image; and
in response to detecting, according to the real-time positioning information, that the navigation device leaves the intersection coverage region, stop displaying the real-time navigation guidance image.

13. The electric device of claim 8, wherein the processor is configured to process the superimposed basic three-dimensional model in the following manners:

for each intersection coverage region among the plurality of intersection coverage regions, traversing all nodes in the each intersection coverage region, selecting two nodes from all the nodes as an ingress node and an egress node, respectively, and generating a plurality of virtual navigation roads, wherein the ingress node serves as a start point of the plurality of virtual navigation roads and the egress node serves as an end point of the plurality of virtual navigation roads;

configuring a plurality of keypoints for each of the plurality of virtual navigation roads, and configuring an observation viewing angle corresponding to each keypoint among the plurality of keypoints according to a distance between the each keypoint and each intersection in the each intersection coverage region;

configuring an induction arrow model material, wherein the basic three-dimensional model is configured with the background model data, and the superimposed basic three-dimensional model comprises the location information corresponding to the background model data; and using the induction arrow model material and location information of the plurality of keypoints of the each of the plurality of virtual navigation roads as induction arrow model data and location information corresponding to the induction arrow model data for the each of the plurality of virtual navigation roads, respectively, using the background model data and induction arrow model data of the plurality of virtual navigation roads as the three-dimensional model data in the three-dimensional real scene model, using the location information corresponding to the background model data and location information corresponding to the induction arrow model data of the plurality of virtual navigation roads as the location information in the three-dimensional real scene model, and using observation viewing angles corresponding to the plurality of keypoints of the each of the plurality of virtual navigation roads as the observation viewing angles in the three-dimensional real scene model.

* * * * *